United States Patent
Shouji et al.

(10) Patent No.: US 11,394,334 B2
(45) Date of Patent: Jul. 19, 2022

(54) POWER CONTROL METHOD AND POWER CONTROL APPARATUS

(71) Applicant: NISSAN MOTOR CO., LTD., Yokohama (JP)

(72) Inventors: Mitsuhiro Shouji, Kanagawa (JP); Hiromichi Kawamura, Kanagawa (JP); Shun Kitauchi, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/431,600

(22) PCT Filed: Feb. 18, 2019

(86) PCT No.: PCT/JP2019/005900
§ 371 (c)(1),
(2) Date: Aug. 17, 2021

(87) PCT Pub. No.: WO2020/170315
PCT Pub. Date: Aug. 27, 2020

(65) Prior Publication Data
US 2022/0140766 A1 May 5, 2022

(51) Int. Cl.
*H02P 27/08* (2006.01)
*H02M 7/5395* (2006.01)

(52) U.S. Cl.
CPC .......... *H02P 27/08* (2013.01); *H02M 7/5395* (2013.01)

(58) Field of Classification Search
CPC .......... H02P 27/00; H02P 27/04; H02P 27/06; H02P 27/08; H02P 27/085; H02P 27/02; H02P 27/045; H02P 21/00; H02P 21/0021; H02P 21/14; H02P 21/18; H02P 21/22; H02P 23/00; H02P 23/07; H02P 23/14; H02P 23/28; H02P 25/00; H02P 25/026; H02P 25/062; H02P 7/00; H02P 7/29; H02P 6/00; H02P 6/005; H02P 6/04; H02P 6/08; H02P 6/28; H02P 1/00; H02P 1/04; H02P 1/16; H02P 1/24; H02P 1/26; H02P 1/42; H02P 1/46; H02P 1/465
See application file for complete search history.

(56) References Cited

U.S. PATENT DOCUMENTS

2008/0106919 A1   5/2008   Shin et al.
2018/0159458 A1   6/2018   Shouji et al.

FOREIGN PATENT DOCUMENTS

| EP | 3104516 A1 * | 12/2016 | ............ H02M 7/538 |
| JP | 2006-217776 A | 8/2006 | |
| JP | 2008-141937 A | 6/2008 | |
| JP | 6414324 B2 | 10/2018 | |

* cited by examiner

*Primary Examiner* — Antony M Paul
(74) *Attorney, Agent, or Firm* — Foley & Lardner LLP

(57) ABSTRACT

A power control method for calculating a duty command value to be used for a PWM control, generating a PWM signal corresponding to a comparison result between the duty command value and a carrier signal, and applying a PWM voltage to a load by driving an inverter based on the PWM signal. The power control method comprises obtaining a compensation amount according to a phase shift generated in the PWM voltage so as to compensate for the shift, correcting the compensation amount according to a cycle of the carrier signal, and correcting the duty command value depending on whether a strength of the carrier signal is increasing or decreasing using the corrected compensation amount.

10 Claims, 10 Drawing Sheets

POWER CONTROL METHOD AND POWER CONTROL APPARATUS

TECHNICAL FIELD

The present invention relates to a power control method and a power control apparatus.

BACKGROUND ART

As a method for controlling an AC-driven load such as a motor by a DC power supply, a pulse width modulation (PWM) control is known. For providing the PWM control, an inverter is provided between a DC power supply and a load, and the inverter is switching-controlled by a PWM signal to supply an AC power in a pseudo manner to the load.

Specifically, a current flowing through the load is detected by way of sampling such as A/D conversion at a predetermined cycle, a duty command value is calculated based on the detected current value, and the duty command value and a carrier wave are compared with each other. Then, a PWM signal is generated according to the comparison result, and the inverter is controlled at the timings of the rise and fall of the PWM signal. With the control described above, the pseudo AC power can be applied to the load.

In a triangular wave comparison PWM method, which is one of PWM control methods, a triangular wave is used as the carrier wave. Therefore, the midpoint of the timings of the rise and fall of the PWM signal coincides with both or one of the peak and valley of the triangular wave. Thus, sampling is performed at the timing of one or both of the peak and valley of the carrier wave, which is the triangular wave, so that the sampling is performed at the midpoint between the rise and fall of the PWM signal. Consequently, since a time difference between sampling and switching control becomes large, the harmonic current (PWM higher harmonic current) due to switching control is less likely to be mixed in the current value obtained by the sampling.

Generally, when the load is driven by AC power of a plurality of phases, an inverter having two switching elements paired for each phase is used. In order to prevent this pair of switching elements from being switching-controlled at the same time, an addition of dead time is performed to delay the switching control by a certain period of time. However, the phase of the PWM signal may be delayed by performing the dead time addition.

JP6414324B discloses a technique for correcting the duty command value according to the state of increase or decrease of the carrier wave. By correcting the duty command value in this way, the phase of the PWM signal is advanced previously according to the state of the carrier wave, and the phase delay of the PWM signal due to the dead time addition can be offset. Consequently, the possibility that the harmonic current is mixed in the current value obtained by the sampling is reduced, and the deterioration of the PWM control accuracy can be suppressed.

SUMMARY OF INVENTION

The calculation of duty command value requires calculation times for sampling, calculating duty command value, etc. Depending on the frequency of the carrier wave, the sampling cycle determined by the frequency may be shorter than the calculation time. In such a case, the duty command value calculation is not completed between the start of sampling and the timing when the next sampling should be performed, and the PWM signal cannot be generated at the desired cycle, and therefore, the load control accuracy may decrease.

In recent years, a modulation method called spread spectrum modulation that randomly switches a plurality of carrier frequencies at high speed and a modulation method that switches carrier frequencies for temperature protection purposes of high-power elements have been examined. Regarding these modulation methods, if the sampling cycle becomes shorter than the calculation time of the duty command value, the load control accuracy may decrease.

In such a case, even if the technique disclosed in JP6414324B is applied, the duty command value cannot be calculated at the desired cycle as long as the sampling cycle becomes shorter than the calculation time of the duty command value, and the deterioration of the load control accuracy cannot be suppressed.

According to one of the aspects of the power control method of the present invention, a duty command value to be used for a PWM control is calculated, a PWM signal corresponding to the comparison result between the duty command value and a carrier signal is generated, and a PWM voltage is applied to a load by driving an inverter based on the PWM signal. Regarding the power control method, a compensation amount is obtained according to a phase shift generated in the PWM voltage to compensate for the shift, the compensation amount is corrected according to the cycle of the carrier signal, and the duty command value is corrected depending on whether the strength of the carrier signal is increasing or decreasing using the corrected compensation amount.

DESCRIPTION OF EMBODIMENTS

Hereinafter, embodiments of the present invention will be described with reference to the drawings.

Figure 1:
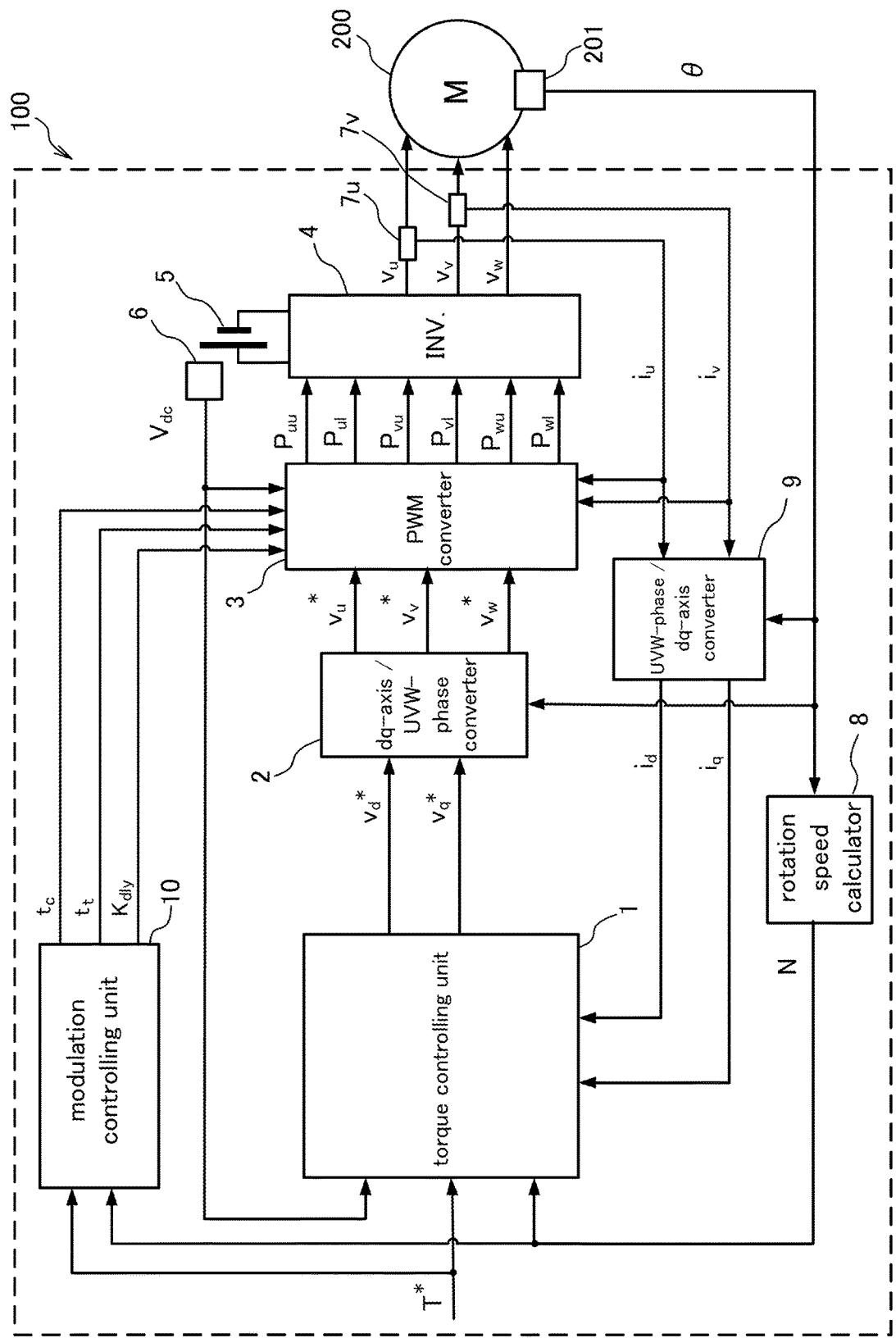
FIG. 1 is a block diagram illustrating a configuration of a power control apparatus.

FIG. 1 is a block diagram illustrating an exemplary configuration of a power control apparatus according to an embodiment of the present invention.

A power control apparatus 100 is an apparatus that controls a motor 200 which is an electrical load. For example, the motor 200 is an electric motor mounted on a hybrid vehicle, an electric vehicle, etc., and the vehicle travels by controlling the motor 200 using the power control apparatus 100.

The power control apparatus 100 converts DC power into AC power and supplies the converted AC power to the motor 200. The power control apparatus 100 includes a torque controlling unit 1, a dq-axis/UVW-phase converter 2, a PWM (Pulse Width Modulation) converter 3, an inverter (INV) 4, a battery 5, a battery voltage detector 6, current detectors 7u and 7v, a motor rotation speed calculator 8, a UVW-phase/dq-axis converter 9, and a modulation controlling unit 10. While the power control apparatus 100 is configured by one controller, the processing by each unit defined from the torque controlling unit 1 to the modulation controlling unit 10 may be performed by executing a stored program by one controller.

The motor 200 is an electric motor driven by a multi-phase alternating current. In the present embodiment, the motor 200 is driven by a 3-phase alternating current, which is a UVW-phase current. In addition, a rotor position detector 201 is provided adjacent to the motor 200.

The rotor position detector 201 is, for example, a resolver and detects the position of the rotor of the motor 200 at a predetermined cycle. The rotor position detector 201 outputs a detection signal indicating the electrical angle $\theta$ of the rotor to the dq-axis/UVW-phase converter 2, the motor rotation speed calculator 8, and the UVW-phase/dq-axis converter 9.

The torque controlling unit 1 acquires a torque command value T*, which determines the driving force of the motor 200, from an host controller (not shown). For example, the host controller calculates the torque command value T* depending on a vehicle driving state such as an accelerator pedal depression level.

A battery voltage detection value $V_{dc}$ of the battery 5 detected by the battery voltage detector 6 is further input, and a d-axis current detection value $i_d$ and a q-axis current detection value $i_q$ of the current flowing through the motor 200, and a rotation speed N of the motor 200 are further input into the torque controlling unit 1.

The d-axis current detection value $i_d$ and q-axis current detection value $i_q$ are obtained by detecting a U-phase current $i_u$ and a V-phase current $i_v$ of the 3-phase alternating current supplied to the motor 200 by the current detectors 7u and 7v and converting the U-phase current $i_u$ and the V-phase current $i_v$ by the UVW-phase/dq-axis converter 9.

A rotation speed N of the motor 200 is acquired by the motor rotation speed calculator 8 as follows. At a predetermined cycle, the rotor position detector 201 obtains the electrical angle $\theta$ by sampling (A/D converting) the signal detected by the resolver. When the motor rotation speed calculator 8 acquires an electrical angle $\theta$ at a certain timing, it obtains a difference between this electrical angle $\theta$ and the electrical angle $\theta$ acquired at the previous timing, and calculates an amount of change in the electrical angles $\theta$ per unit time from the difference. Then, the motor rotation speed calculator 8 calculates the rotation speed N of the motor 200 from the amount of change in the electrical angle $\theta$ per unit time.

The torque controlling unit 1 calculates a d-axis voltage command value $v_d^*$ and a q-axis voltage command value $v_g^*$ by executing a current vector control operation based on the input torque command value T*, the battery voltage detection value $V_{dc}$, the d-axis current detection value $i_d$ and q-axis current detection value $i_q$, and the rotation speed N of the motor 200. The torque controlling unit 1 outputs the d-axis voltage command value $v_d^*$ and q-axis voltage command value $v_g^*$ to the dq-axis/UVW-phase converter 2.

The dq-axis/UVW-phase converter 2 converts the d-axis voltage command value $v_d^*$ and q-axis voltage command value $v_g^*$ calculated by the torque controlling unit 1 to a U-phase PWM voltage command value $v_u^*$, a V-phase voltage command value $v_v^*$, and a W-phase voltage command value $v_w^*$, which are 3-phase PWM voltage command values, based on the electrical angle $\theta$ obtained by rotor position detector 201 as shown in the following equation (1). Then, the dq-axis/UVW-phase converter 2 outputs the converted 3-phase PWM voltage command values $v_u^*$, $v_v^*$, and $v_w^*$ to the PWM converter 3.

[Equation 1]

$$\begin{bmatrix} v_u^* \\ v_v^* \\ v_w^* \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} \cos\theta & -\sin\theta \\ \sin\theta & \cos\theta \end{bmatrix} \begin{bmatrix} v_d^* \\ v_q^* \end{bmatrix} \quad (1)$$

The PWM converter 3 accepts inputs of the battery voltage detection value $V_{dc}$, which is output from the battery voltage detector 6, the 3-phase PWM voltage command values $v_u^*$, $v_v^*$, and $v_w^*$ converted by the dq-axis/UVW-phase converter 2, and the U-phase current $i_u$ and V-phase current $i_v$ detected by current detectors 7u and 7v. The PWM converter 3 further accepts inputs of a carrier cycle $t_c$, a control cycle $t_r$, and a correction amount $K_{dly}$ related to the carrier wave output from the modulation controlling unit 10. Based on these inputs, the PWM converter 3 generates PWM signals $P_{uu}$, $P_{ul}$, $P_{vu}$, $P_{vl}$, $P_{wu}$ and $P_{wl}$, which are pulse signals used for pulse width modulation control (PWM control).

The PWM converter 3 calculates a duty command value based on the 3-phase PWM voltage command values $v_u^*$, $v_v^*$ and $v_w^*$, compares the duty command value with the carrier wave, and generates PWM signals $P_{uu}$, $P_{ul}$, $P_{vu}$, $P_{vl}$, $P_{wu}$ and $P_{wl}$ according to the comparison result. Further, the PWM converter 3 generates a PWM signal for each control cycle $t_r$.

The inverter 4 inverts the DC power of the battery 5 into the AC power in a pseudo manner, and supplies the inverted AC power to each phase of the motor 200 by controlling the switching element based on the PWM signals $P_{uu}$, $P_{ul}$, $P_{vu}$, $P_{vl}$, $P_{wu}$ and $P_{wl}$ output from the PWM converter 3.

In the present embodiment, the inverter 4 includes 6 arms of 3 phases. With such a configuration, the inverter 4 comprises 6 switching elements (arms) and is driven by 3 phases of UVW. Specifically, the inverter 4 includes three wires corresponding to each phase and connected in parallel to the battery 5, and has a pair of switching elements connected in series to each wire. Then, in these wires, the motor 200 is connected between a pair of switching elements, which are connected in series. Further, as the switching element, for example, a power element constructed by a field-effect transistor, etc. is employed, and the switching element can be switched to ON or OFF depending on the level of the PWM signal, which is a pulse signal supplied to the control terminal (for example, gate terminal).

The battery 5 is configured as a part of the power control apparatus 100 in the present embodiment, but it may also be configured as a separate body from the power control apparatus 100. The battery 5 is a DC power supply, for example, a lithium-ion battery for a vehicle.

Hereinafter, in each phase, the switching element connected between the power terminal of the motor 200 and the positive terminal of the battery 5 is referred to as the upper stage switching element, and the switching element connected between the power terminal of the motor 200 and the negative terminal of the battery 5 is referred to as the lower stage switching element. Further, a potential voltage difference of the battery voltage detection value $V_{dc}$ is generated between the two ends, i.e., the positive terminal and the negative terminal of the battery 5. For convenience of explanation, a potential voltage generated at the positive terminal will be referred to as "$+V_{dc}/2$", and a potential voltage generated at the negative terminal will be referred to as "$-V_{dc}/2$".

The upper stage switching element supplies the motor 200 with the potential voltage "$+V_{dc}/2$" generated at the positive terminal of the battery 5 when the element is switched to ON (conducted state), and stops the potential voltage supply when the element is switched to OFF (non-conducted state). On the other hand, the lower stage switching element supplies the motor 200 with the potential voltage "$-V_{dc}/2$" generated at the negative terminal of the battery 5 when the element is switched to ON, and stops supplying the potential voltage to the motor 200 when the element is switched to OFF.

The conducted state (ON/OFF) of each of the 6 switching elements provided in the inverter 4 is controlled based on the PWM signals $P_{uu}$, $P_{ul}$, $P_{vu}$, $P_{vl}$, $P_{wu}$ and $P_{wl}$ generated by the PWM converter 3. Thus, the DC power of the battery 5 is converted to AC power in a pseudo manner, and the converted AC power is supplied to the motor 200.

Hereinafter, regarding the control in the PWM converter 3, the generation processing of the PWM signal $P_{uu}$ for the upper stage switching element and the PWM signal $P_{ul}$ for the lower stage switching element of the pair of switching elements corresponding to the U phase will be described as a representative. Similarly, for the V and W phases, the PWM converter 3 outputs the PWM signals $P_v u$ and $P_{vl}$ corresponding to the V phase and the PWM signals $P_{wu}$ and $P_{wl}$ corresponding to the W phase.

The PWM converter 3 obtains the duty command value based on the U-phase PWM voltage command value $v_u^*$ and the battery voltage detection value $V_{dc}$. The PWM converter 3 compares the obtained duty command value with the carrier wave whose amplitude is the battery voltage detection value $V_{dc}$ and whose cycle is the carrier cycle $t_c$, and outputs the PWM signal $P_{uu}$ for the upper stage switching element and the PWM signal $P_{ul}$ for the lower stage switching element according to the comparison result.

When the PWM signal $P_{uu}$ is at a high level, the upper stage switching element is turned ON, and the potential voltage of "$+V_{dc}/2$" is supplied to the U-phase terminal of the motor 200. When the PWM signal $P_{ul}$ is at the high level, the lower stage switching element is turned ON, and the potential voltage of "$-V_{dc}/2$" is supplied to the U-phase terminal of the motor 200. By controlling these switching elements of the upper stage and the lower stage, a potential voltage difference of $V_{dc}$ can be generated between the two ends of the U-phase terminal of the motor 200.

Further, the PWM converter 3 adds a dead time tat to the switching timing in the PWM signals $P_{uu}$ and $P_{ul}$ and outputs the PWM signals $P_{uu}$ and $P_{ul}$ whose switching timing is delayed by the dead time tat to the inverter 4 in order to prevent a pair of switching elements constructed by upper and lower stages from being turned ON at the same time.

The inverter 4 supplies a U-phase PWM voltage $v_u$ to the U-phase coil of the motor 200 by switching the switching element on/off based on the levels of the PWM signals $P_{uu}$ and $P_{ul}$. Consequently, an alternating current $i_u$ flows through the U-phase coil of the motor 200. Thus, the alternating current is supplied to the motor 200 via the inverter 4 by the processing in the PWM converter 3.

The current detectors $7_u$ and $7_v$ detect the U-phase current $i_u$ and V-phase current $i_v$ supplied to the motor 200, respectively. The current detector $7_u$ is provided on the U-phase power line provided between the inverter 4 and the U-phase coil of the motor 200, and the current detector $7_v$ is provided on the V-phase power line between the inverter 4 and the V-phase coil of the motor 200. The current detectors $7_u$ and $7_v$ output the detected U-phase current $i_u$ and V-phase current $i_v$ to the PWM converter 3 and the UVW-phase/dq-axis converter 9.

The UVW-phase/dq-axis converter 9 acquires detection signals for the U-phase current $i_u$ and V-phase current $i_v$ output from the current detectors $7_u$ and $7_v$, and obtains the U-phase current $i_u$ and V-phase current $i_v$ by performing sampling processing for the A/D conversion from an analog signal to a digital signal for each detection signal. Then, the UVW-phase/dq-axis converter 9 calculates the d-axis current detection value $i_d$ and q-axis current detection value $i_q$ based on the detection values of the U-phase current $i_u$ and the V-phase current $i_v$ and the electrical angle θ obtained by the rotor position detector 201 according to the following equation (2). Equation (2) utilizes a technical property that a sum of U-phase current $i_u$, V-phase current $i_v$, and W-phase current $i_m$ equals to zero.

[Equation 2]

$$\begin{bmatrix} i_d \\ i_q \end{bmatrix} = \begin{bmatrix} \cos\theta & \sin\theta \\ -\sin\theta & \cos\theta \end{bmatrix} \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} i_u \\ i_v \\ -i_u - i_v \end{bmatrix} \quad (2)$$

The UVW-phase/dq-axis converter 9 outputs the calculated d-axis current detection value $i_d$ and q-axis current detection value $i_q$ to the torque controlling unit 1. Thus, in the torque controlling unit 1, a feedback control for the d-axis voltage command value $v_d^*$ and q-axis voltage command value $v_g^*$ is performed using the d-axis current detection value $i_d$ and q-axis current detection value $i_q$.

Figure 2:
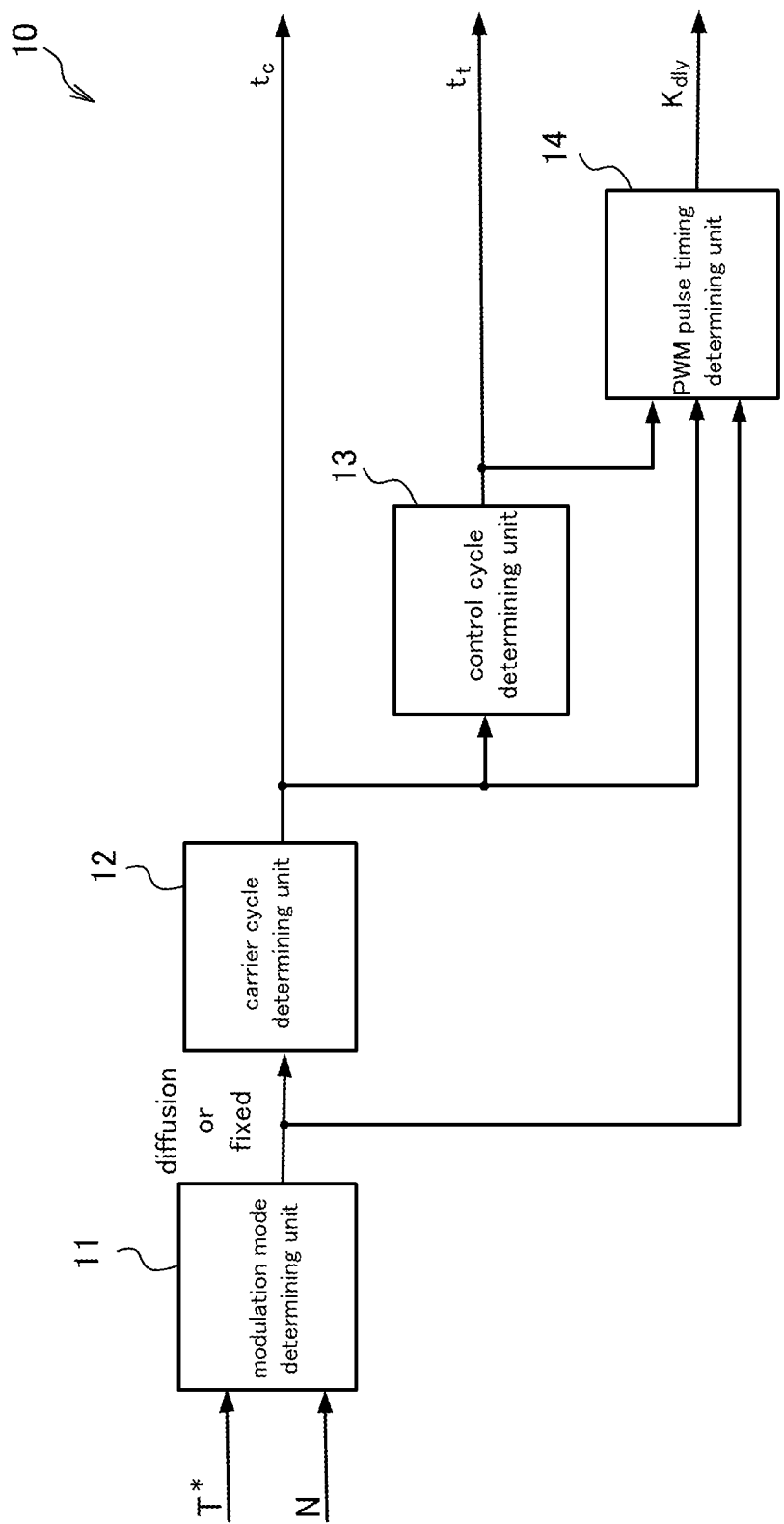
FIG. 2 is a block diagram illustrating a detailed configuration of a modulation controlling unit.

FIG. 2 is a block diagram illustrating a detailed configuration of the modulation controlling unit 10. The modulation controlling unit 10 includes a diffusion mode determining unit 11, a carrier cycle determining unit 12, a control cycle determining unit 13, and a PWM pulse timing determining unit 14.

The modulation controlling unit 10 determines whether the mode is a fixed mode in which the frequency of the carrier wave is fixedly used, or a diffusion mode in which the frequencies of a plurality of carrier signals are switched based on a predetermined repeating rule. Further, when the motor 200 has a relatively low rotation speed and a low load, the vibration caused by the operation of the inverter 3 may resonate and noise may be generated. Thus, by selecting the diffusion mode, frequencies of a plurality of carrier waves are used, and therefore, since resonance is suppressed, it is possible to achieve a reduction in noise.

Then, the modulation controlling unit 10 outputs the carrier cycle $t_c$, the control cycle $t_r$ and the correction amount $K_{dly}$ according to the determined mode. In the fixed mode, one carrier wave of the carrier cycle $t_c$ is used fixedly, and in the diffusion mode, a combination of different carrier waves of the carrier cycle $t_c$ is used, and the carrier cycle $t_c$ changes according to a predetermined repeating rule. Further, the fixed mode is an example of the first mode, and the diffusion mode is an example of the second mode.

Table 1 shows the carrier cycle $t_c$, the control cycle $t_t$, and the correction amount $K_{dly}$ according to the mode determined. Further, the modulation controlling unit 10 has a counter that counts 0-4 for each control cycle $t_t$ and is reset to 0 after 4. When the modulation controlling unit 10 determines that it is in the diffusion mode, the modulation controlling unit 10 also changes the output according to the value of the counter. Hereinafter, the carrier cycle $t_c$ of the carrier wave in the fixed mode will be referred to as the basic cycle $t_{base}$.

TABLE 1

| conditions | | outputs | | |
|---|---|---|---|---|
| mode | counter (0-4) | carrier cycle $t_c$ | control cycle $t_t$ | correction amount $K_{dly}$ |
| fixed | — | $t_{base}$ | $t_{base}/2$ | $K_1$ |
| diffusion | 0-3 | $t_{base}$ | $t_{base}/2$ | $K_2$ |
| | 4 | $t_{base}/2$ | $t_{base}/2$ | 0 |

In the fixed mode, the carrier cycle $t_c$ of the carrier wave is the basic cycle $t_{base}$, and the control cycle $t_t$ is $t_{base}/2$, which is a half of the basic cycle $t_{base}$. A correction amount $K_{dly}$ is a first correction amount $K_1$ determined by the equation (7) to be described later.

In the diffusion mode, when the counter is 0-3, the carrier cycle $t_c$ is the basic cycle $t_{base}$ and the control cycle $t_t$ is $t_{base}/2$, being equal to those in the fixed mode. A correction amount $K_{dly}$ is a second correction amount $K_2$ determined by the equation (8) to be described later. When the counter is 4, the carrier cycle $t_c$ is $t_{base}/2$, the control cycle $t_t$ is $t_{base}/2$, and the correction amount $K_{dly}$ becomes zero.

In the diffusion mode, the carrier cycle $t_c$ changes only when the counter is 4 while the count can be 0-4. With such a configuration, among the 5 control cycles $t_t$, the carrier cycle $t_c$ is $t_{base}$ and the correction amount $K_{dly}$ is the second correction amount $K_2$ in 4 cycles, and the carrier cycle $t_c$ is $t_{base}/2$ and the correction amount $K_{dly}$ is zero in 1 cycle.

Figure 3:
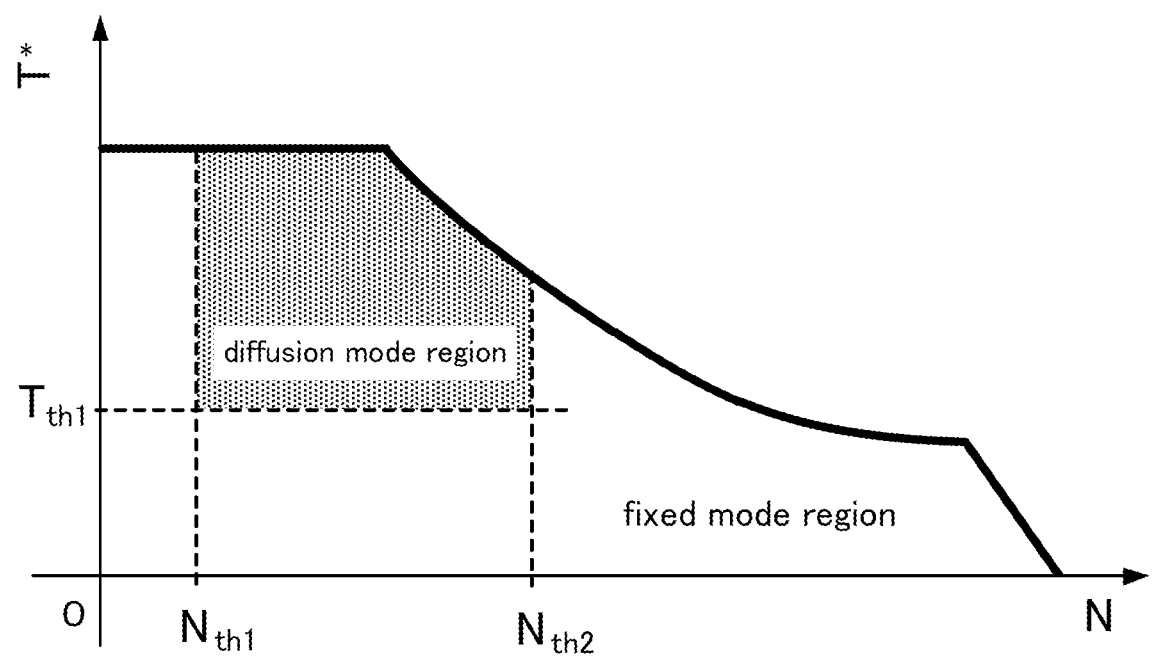
FIG. 3 is a graph used for the processing of a modulation controlling unit.

The diffusion mode determining unit 11 selects either the fixed mode or the diffusion mode based on the rotation speed N and the torque command value T* using the graph shown in FIG. 3. In the fixed mode, the carrier wave of the basic cycle $t_{base}$ is fixedly used, and in the diffusion mode, the carrier waves of two different carrier cycles $t_c$, which can be $t_{base}$ or $t_{base}/2$, are switched based on a predetermined repeating rule. The diffusion mode determining unit 11 outputs a signal indicating the selected mode to the carrier cycle determining unit 12 and the PWM pulse timing determining unit 14.

FIG. 3 is a graph illustrating a relation between the rotation speed N and the torque command value T*. When the torque command value T* is larger than the torque threshold $T_{th1}$ and meanwhile the rotation speed N is larger than a first threshold $N_{th1}$ and smaller than a second threshold $N_{th2}$, the diffusion mode determining unit 11 selects the diffusion mode. Otherwise, the diffusion mode determining unit 11 selects the fixed mode. For this reason, when the rotation speed N is relatively low and the torque command value T* is large, the diffusion mode is selected. Further, the diffusion mode may be selected when the torque command value T* is larger than the torque threshold $T_{th1}$ and the rotation speed N is smaller than the second threshold $N_{th2}$ without using the first threshold $N_{th1}$.

Referring again to FIG. 2, the carrier cycle determining unit 12 outputs a basic cycle $t_{base}$ as the carrier cycle $t_c$ of the carrier wave when the fixed mode is selected. Further, the carrier cycle determining unit 12 has a counter, and when the diffusion mode is selected, the counter is counted up for each control cycle $t_t$. The carrier cycle determining unit 12 outputs $t_{base}$ as the carrier cycle $t_c$ when the diffusion mode is selected and the counter is 0-3. The carrier cycle determining unit 12 outputs $t_{base}/2$ as the carrier cycle $t_c$ when the diffusion mode is selected and the counter is 4. The carrier cycle determining unit 12 outputs such a carrier cycle $t_c$ to the PWM converter 3 shown in FIG. 1 in addition to the control cycle determining unit 13 and the PWM pulse timing determining unit 14.

The control cycle determining unit 13 outputs $t_{base}/2$ as the control cycle $t_t$ to the PWM pulse timing determining unit 14 and the PWM converter 3 regardless of the input.

The PWM pulse timing determining unit 14 outputs the first correction amount $K_1$ as the correction amount $K_{dly}$ when the input signal from the diffusion mode determining unit 11 indicates the fixed mode. If the input signal from the diffusion mode determining unit 11 indicates the diffusion mode, the PWM pulse timing determining unit 14 outputs the second correction amount $K_2$ as the correction amount $K_{dly}$ when the carrier cycle $t_c$ is $t_{base}$ and outputs zero as the correction amount $K_{dly}$ when the carrier cycle $t_c$ is $t_{base}/2$. The PWM pulse timing determining unit 14 outputs such a correction amount $K_{dly}$ to the PWM converter 3.

Thus, in the PWM pulse timing determining unit 14, the correction amount $K_{dly}$ is determined according to the equations (7) and (8) to be described later based on the mode selected by the diffusion mode determining unit 11 and the carrier cycle $t_c$ determined by the carrier cycle determining unit 12.

Figure 4:
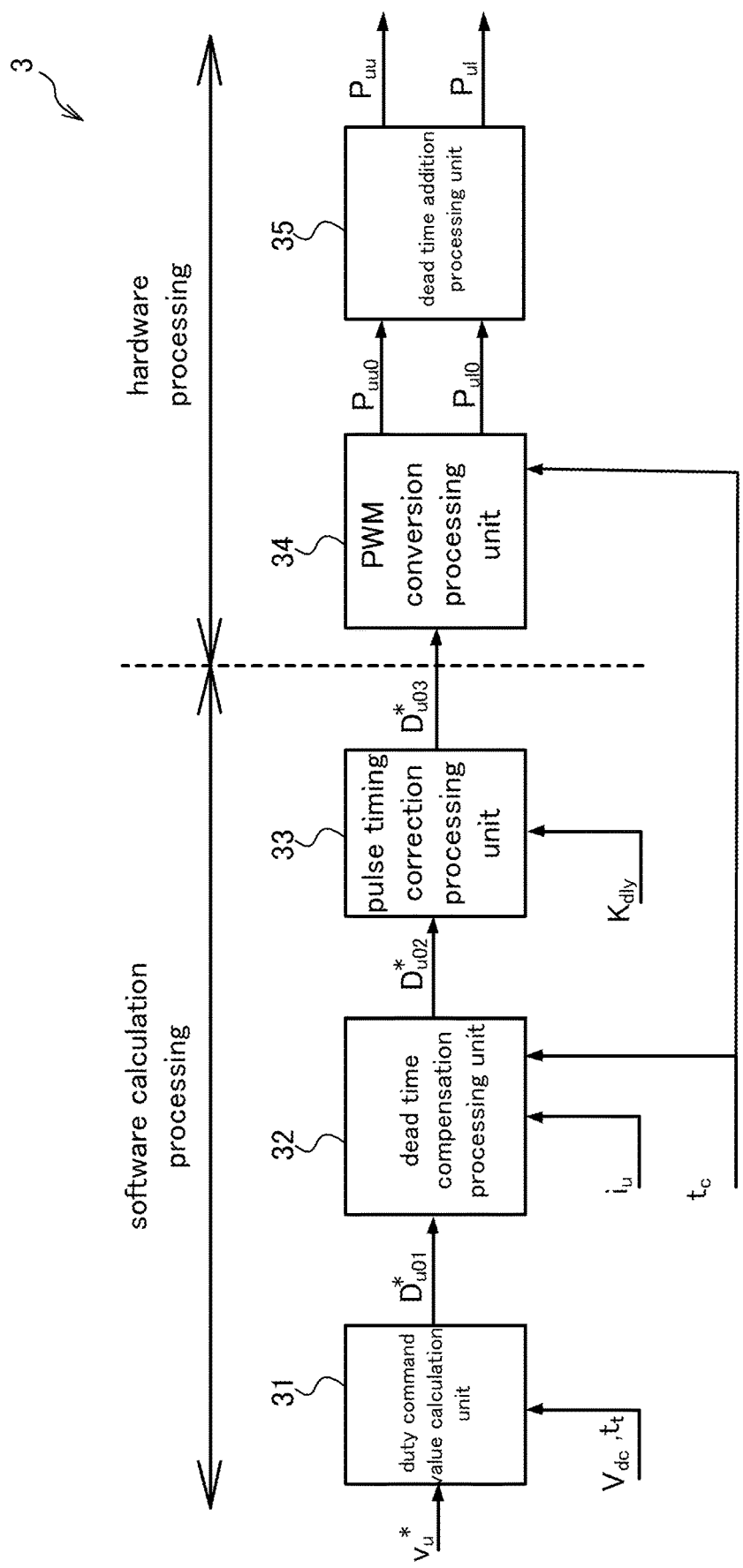
FIG. 4 is a block diagram illustrating a detailed configuration of a PWM converter.
Figure 5:
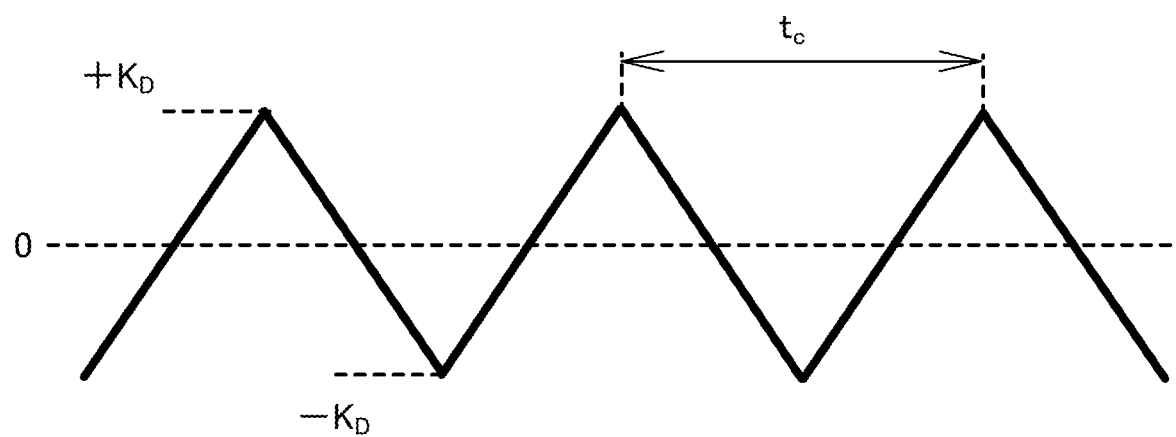
FIG. 5 is a diagram illustrating a carrier wave.

FIG. 4 is a block diagram illustrating a detailed configuration of the PWM converter 3. FIG. 5 is a diagram illustrating a carrier wave used in the processing of the PWM converter 3.

The PWM converter 3 includes a duty command value calculating unit 31, a dead time compensation processing unit 32, a pulse timing correction processing unit 33, a PWM conversion processing unit 34, and a dead time addition processing unit 35. In the present embodiment, regarding the duty command value calculating unit 31, the dead time compensation processing unit 32, and the pulse timing correction processing unit 33 among these blocks, these functions are realized as a software by executing a program by a general-purpose controller. Regarding the PWM conversion processing unit 34 and the dead time addition processing unit 35, these functions are realized as a hardware by a microcomputer having specific functions.

Further, in the PWM control of the present embodiment, the carrier wave shown in FIG. 5 is used as the carrier signal. For example, a generation of a carrier signal is realized by a counter, and a carrier wave is generated by increasing or decreasing the count value with the passage of time. Further, in the present embodiment, the PWM conversion processing unit 34 has such a counter and internally generates a carrier wave.

Referring again to FIG. 4, the duty command value calculating unit 31 calculates a duty command value $D_{u01}*$ to generate the U-phase PWM voltage $v_u$ applied to the motor 200 according to the following equation (3) based on the U-phase PWM voltage command value $v_u*$ output from the dq-axis/UVW-phase converter 2, the battery voltage detection value $V_{dc}$ output from the battery voltage detector 6, and an amplitude $K_D$ of the carrier wave. Further, the amplitude $K_D$ of the carrier wave is stored in advance in the duty command value calculating unit 31. Moreover, the calculation of the duty command value $D_{u01}^*$ in the duty command value calculating unit 31 is performed for each control cycle $t_r$.

[Equation 3]

$$D_{u01}^* = \frac{v_u^*}{V_{dc}/2} \times K_D \quad (3)$$

According to the equation (3), the larger the U-phase PWM voltage command value $v_u^*$, the larger the duty command value $D_{u01}^*$, and the smaller the battery voltage detection value $V_{dc}$, the larger the duty command value $D_{u01}^*$. The duty command value calculating unit 31 outputs the calculated duty command value $D_{u01}^*$ to the dead time compensation processing unit 32.

Here, the pulse width of the PWM voltage changes due to the addition of the dead time tat by the dead time addition processing unit 35 in the subsequent stage. The dead time compensation processing unit 32 performs dead time compensation processing on the duty command value $D_{u01}^*$ to compensate for the change caused by the dead time addition in this subsequent stage. Such compensation processing is referred to as dead time compensation.

In the present embodiment, according to the following equation (4), the dead time compensation processing unit 32 defines a sign for the duty command value $D_{u01}^*$ by sgn($i_u$) based on the polarity (positive or negative) of the U-phase current $i_u$ and calculates the duty command value $D_{u02}^*$ by adding or subtracting the compensation amount "2 $K_D t_{dt}/t_c$". Further, the carrier cycle $t_c$ obtained by the modulation controlling unit 10 is used in this equation. The dead time tat is stored in advance in the dead time compensation processing unit 32.

[Equation 4]

$$D_{u02}^* = D_{u01}^* + \text{sgn}(i_u) \times 2K_D \frac{t_{dt}}{t_c} \quad (4)$$

Specifically, when the U-phase current $i_u$ is positive, namely, when the U-phase current $i_u$ flows from the inverter 4 to the motor 200, the dead time compensation processing unit 32 performs compensation for the duty command value $D_{u01}^*$ so that the off period of the U-phase PWM voltage $v_u$ is shortened. Further, the off period is the period during which the potential voltage of the negative terminal of the battery 5 is applied to the U-phase of the motor 200. On the other hand, when the U-phase current $i_u$ is negative, namely, when the U-phase current $i_u$ flows from the motor 200 to the inverter 4, the dead time compensation processing unit 32 performs compensation for the duty command value $D_{u01}^*$ so that the off period of the U-phase PWM voltage $v_u$ becomes long.

According to the equation (4), the dead time compensation processing unit 32 calculates the compensation amount "2 $K_D t_{dt}/t_c$" using the amplitude $K_D$ of the carrier wave, the carrier cycle $t_c$, and the dead time $t_{dt}$.

When the U-phase current $i_u$ is positive, namely, when the U-phase current $i_u$ flows from the inverter 4 to the motor 200, the dead time compensation processing unit 32 calculates the duty command value $D_{u02}^*$ by adding the compensation amount "2 $K_D t_{dt}/t_c$" to the duty command value $D_{u01}^*$ so that the off period of the U-phase PWM voltage $v_u$ is shortened.

On the other hand, when the U-phase current $i_u$ is negative, namely, when the U-phase current $i_u$ flows from the motor 200 to the inverter 4, the dead time compensation processing unit 32 calculates the duty command value $D_{u02}^*$ by subtracting the compensation amount "2 $K_D t_{dt}/t_c$" from the duty command value $D_{u01}^*$ so that the off period of the U-phase PWM voltage $v_u$ becomes long.

The pulse timing correction processing unit 33 calculates the duty command value $D_{u03}^*$ by correcting the duty command value $D_{U02}^*$. The phase of the PWM signal (switching timing between high level and low level) can be corrected by this correction by the pulse timing correction processing unit 33, and the intermediate value of the pulse width of the U-phase PWM voltage $v_u$ can be matched with both or one of the peak and valley of the carrier wave.

Specifically, the pulse timing correction processing unit 33 calculates the duty command value $D_{u03}^*$ according to the following equation (5) by switching the sign of the correction amount $K_{dly}$ determined by the modulation controlling unit 10 according to the polarity of the change amount $\Delta C$ of the triangular wave and adding or subtracting the correction amount $K_{dly}$ to or from the duty command value $D_{U02}^*$.

[Equation 5]

$$D_{u03}^* = D_{u02}^* + \text{sgn}(\Delta C) \times K_{dly} \quad (5)$$

As shown in the second term on the right side of the equation (5), the positive and negative signs for the correction amount $K_{dly}$ are determined by a sign function sgn($\Delta C$). As shown in Table 1, the correction amount $K_{dly}$ is determined by the equations (7) and (8) to be described later. $\Delta C$ is the change amount of the carrier wave, and is a difference between the count values of the two triangular waves obtained at different timings during one control operation. In the present embodiment, the change amount $\Delta C$ of the carrier wave is calculated by subtracting the value $C_1$ obtained from the previous carrier wave from the value $C_2$ obtained from the current carrier wave according to the following equation (6).

[Equation 6]

$$\Delta C = C_2 - C_1 \quad (6)$$

The pulse timing correction processing unit 33 determines that the carrier wave is in an increasing section when the change amount $\Delta C$ calculated according to the equation (6) is larger than zero, and determines that the carrier wave is in a decreasing section when the change amount $\Delta C$ is smaller than zero. Further, the pulse timing correction processing unit 33 may acquire 3 or more count values at different timings instead of 2 count values of the carrier wave, and may determine the increase or decrease of the carrier wave based on those count values.

Thus, when the carrier wave is in an increasing section, the pulse timing correction processing unit 33 adds the correction amount $K_{dly}$ to the duty command value $D_{u02}^*$ so as to obtain the duty command value $D_{u03}^*$. Since the next section in which the calculated duty command value $D_{u03}^*$ is to be used is a decreasing section, the phase of the PWM signal advances by adding the correction amount $K_{dly}$.

On the other hand, when the carrier wave is in a decreasing section, the pulse timing correction processing unit 33 subtracts the correction amount $K_{dly}$ from the duty command value $D_{u02}*$ to obtain the duty command value $D_{u03}*$. Since the next section in which the calculated duty command value $D_{u03}*$ is to be used is an increasing section, the phase of the PWM signal is advanced by subtracting the correction amount $K_{d}y$.

Thus, the pulse timing correction processing unit 33 calculates the duty command value $D_{u03}*$ by increasing or decreasing the correction amount $K_{dly}$ according to whether the carrier wave is increasing or decreasing. Then, the pulse timing correction processing unit 33 outputs the corrected duty command value $D_{u03}*$ to the PWM conversion processing unit 34. The phase of the PWM signal obtained in the processing of the subsequent stage can be advanced previously by using such a duty command value $D_{u03}*$.

The PWM conversion processing unit 34 compares the duty command value $D_{u03}*$ with the carrier wave and generates the PWM signals $P_{uu0}$ and $P_{ul0}$. Further, this comparison processing is generally referred to as comparison matching. The duty command value $D_{u03}*$ is stored in the register of the microcomputer that realizes the function of the PWM conversion processing unit 34, and is compared with the carrier wave. Further, the carrier cycle $t_c$ of the carrier wave to be used in this processing is determined according to the output from the modulation controlling unit 10.

The duty command value $D_{u03}*$ is updated at the timing of peaks or valleys of the carrier wave, namely, in every control cycle $t_t$. Therefore, when the control cycle $t_t$ is $t_{base}/2$, the same duty command value $D_{u03}*$ is used from the timing of a peak or valley of the carrier wave to the timing of the next peak or valley. When the control cycle $t_t$ is $t_{base}$, the same duty command value $D_{u03}*$ is used from the timing when the carrier wave becomes a peak to the next timing when the carrier wave becomes a peak, or from the timing when the carrier wave becomes a valley to the next timing when the carrier wave becomes a valley.

Figure 7:
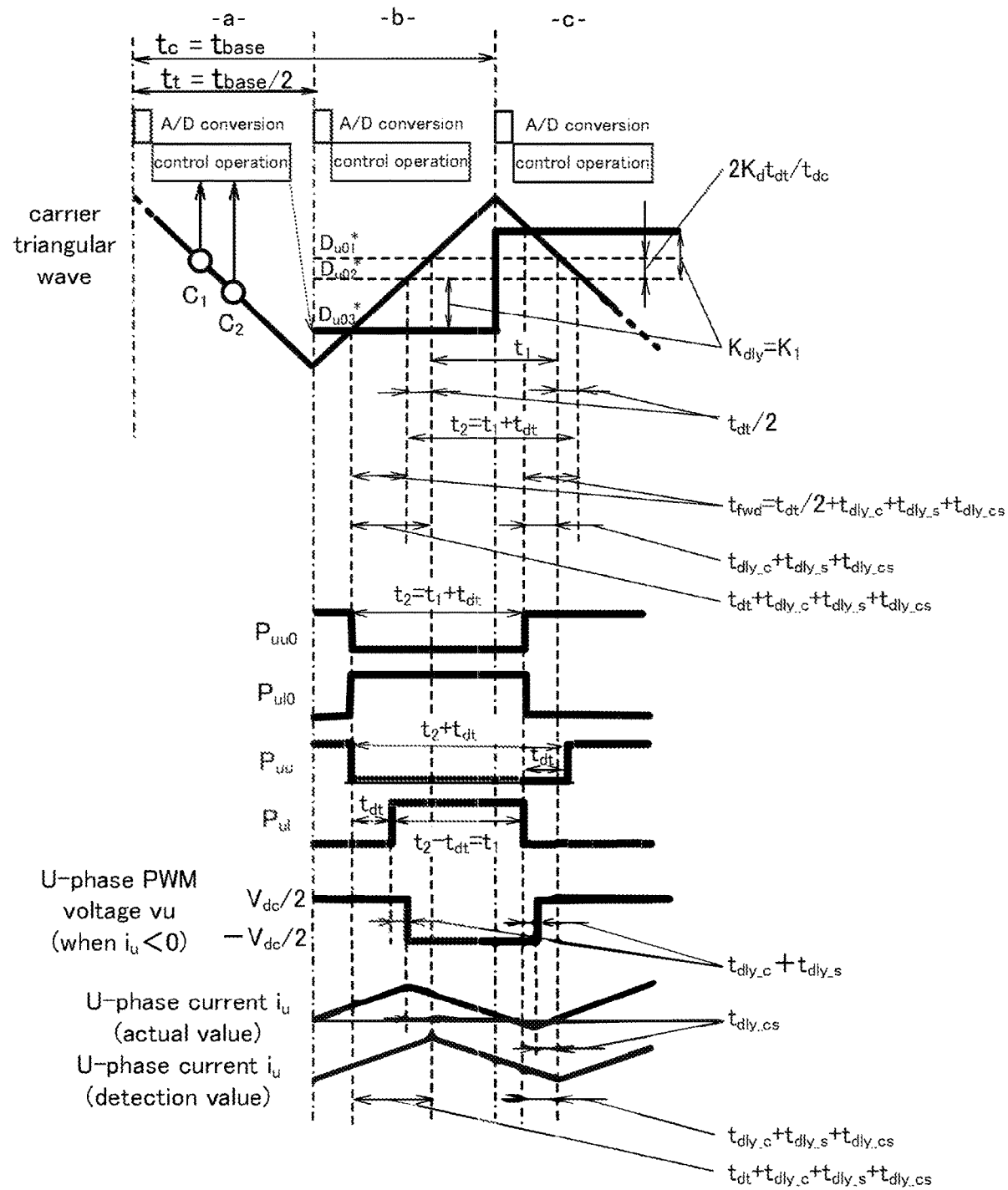
FIG. 7 is an explanatory diagram of an example of a PWM control.

For example, if the U-phase current $i_u$ is negative as shown in FIG. 7, the PWM conversion processing unit 34 sets the PWM signal $P_{uu0}$ to a low level when the duty command value $D_{u03}*$ is smaller than the carrier wave. The PWM conversion processing unit 34 sets the PWM signal $P_{uu0}$ to a high level when the duty command value $D_{u03}*$ is larger than the carrier wave. The PWM signal $P_{ul0}$ for the lower stage switching element is set so that the level is inverted with respect to the PWM signal $P_{uu0}$ for the upper stage switching element. The PWM conversion processing unit 34 outputs the PWM signals $P_{uu0}$ and $P_{ul0}$ which have thus been generated, to the dead time addition processing unit 35.

The dead time addition processing unit 35 performs a processing of adding the dead time tat to the PWM signals $P_{uu0}$ and $P_{ul0}$ calculated by the PWM conversion processing unit 34, and generates the PWM signals $P_{uu}$ and $P_{ul}$.

In the present embodiment, the dead time addition processing unit 35 generates the PWM signals $P_{uu}$ and $P_{ul}$ by delaying the rise timing by the dead time tat for each of the PWM signals $P_{uu0}$ and $P_{ul0}$. The dead time addition processing unit 35 outputs the generated PWM signals $P_{uu}$ and $P_{ul}$ to the inverter 4.

By delaying the rise timing of the PWM signals $P_{uu0}$ and $P_{ul0}$ by the dead time tat, it is possible to prevent a pair of switching elements from being turned ON at the same time and the voltage of the U-phase terminal of the motor 200 from becoming unstable.

Next, the correction amount $K_{dly}$ used in the equation (5) will be described. As shown in Table 1, in the fixed mode, the correction amount $K_{dly}$ becomes the first correction amount $K_1$, and in the diffusion mode, when the counter is 0-3, the correction amount $K_{dly}$ becomes the second correction amount $K_2$, and when the counter is 4, the correction amount $K_{dly}$ becomes zero. The first correction amount $K_1$ and the second correction amount $K_2$ are respectively obtained as follows.

Besides the addition of the dead time $t_{dt}$ by the dead time addition processing unit 35, the transfer delay $t_{dly\_c}$, which is the delay time in the PWM signal transmission circuit, the operation delay $t_{dly\_s}$, which is the delay time due to the operation of the switching elements, the detection delay $t_{dly\_s}$, which is the delay time due to the sampling in sensors, input circuits, etc., and so on are also considered as the factors that delay the PWM signals $P_{uu}$ and $P_{ul}$. Further, the operation delay $t_{dly\_s}$ is an average value of the delay time of the ON operation and the delay time of the OFF operation of the switching elements.

Due to these delays, the phase may be delayed in the generated U-phase PWM voltage $v_u$ or the measured U-phase current $i_u$. Therefore, the pulse timing correction processing unit 33 generates the duty command value $D_{u03}*$ by correcting the duty command value $D_{u02}*$ so that the phase shifts of the PWM signals $P_{uu}$ and $P_{ul}$ are suppressed.

The first correction amount $K_1$ used in the fixed mode is defined by the following equation (7).

[Equation 7]

$$K_1 = 2K_D\left(\frac{t_{dt}}{t_c} + 2\frac{t_{dly\_c}}{t_c} + 2\frac{t_{dly\_s}}{t_c} + 2\frac{t_{dly\_cs}}{t_c}\right) \quad (7)$$

When the unit system is converted from the time unit to the amplitude of the carrier wave for the first correction amount $K_1$, the correction amount becomes the time corresponding to a sum of the half value of the dead time tat, the transfer delay $t_{dly\_c}$, the detection delay $t_{dly\_cs}$, and the operation delay $t_{dly\_s}$, namely, "$t_{dt}/2+t_{dly\_c}+t_{dly\_s}+t_{dly\_cs}$". Further, the conversion of the unit system is performed based on the fact that the carrier wave changes by "$2K_D$", which is twice the amplitude, in a half cycle "$t_c/2$" of the carrier wave.

With such configuration, the first correction amount $K_1$ is determined according to the delays that occur in the power control apparatus 100, and corresponds to the compensation amount that compensates for these delays. Further, the delay component included in the first correction amount $K_1$ of the equation (7) is an example of the generated delays, and the first correction amount $K_1$ does not need to include some of these delays, and may include other delays.

Further, the second correction amount $K_2$ to be used in the diffusion mode can be determined by the following equation (8).

[Equation 8]

$$K_2 = 1.25 K_1 \quad (8)$$

The reason why the second correction amount $K_2$ is 1.25 times (5/4 times) the first correction amount $K_1$ is as follows. As for the correction amount $K_{dly}$ in the diffusion mode, the second correction amount $K_2$ is used in four (counter: 0-3) and becomes zero in one (counter: 4) of the five control cycles $t_t$ (counter: 0-4). On the other hand, as for the correction amount $K_{dly}$ in the fixed mode, the first correction amount $K_1$ is fixedly used. Therefore, by satisfying the equation (8), if all of the five control cycles $t_t$ are considered together, the sums of the correction amounts $K_{dly}$ in the fixed mode and the diffusion mode become $5K_1$ and thus become equal.

Further, as described above, by performing the correction using the first correction amount $K_1$ shown in the equation (7), the phase of the PWM signal can be changed by the time corresponding to the sum of the half value of the dead time $t_{dt}$, which is the conversion value of the first correction amount $K_1$ to the time unit, the transfer delay $t_{dly\_c}$, the detection delay $t_{dly\_cs}$, and the operation delay $t_{dly\_s}$, namely, by "$t_{dt}/2 + t_{dly\_c} + t_{dly\_s} + t_{dly\_cs}$". For convenience in the description below, the amount of phase change caused by the first correction amount $K_1$ is defined as $t_{fwd}$ as in the following equation.

[Equation 9]

$$t_{fwd} = \frac{t_{dt}}{2} + t_{dly\_c} + t_{dly\_s} + t_{dly\_cs} \quad (9)$$

With such a configuration, the phase can be compensated by $t_{fwd}$ by the correction using the first correction amount $K_1$ shown in the equation (7). Further, by the correction using the second correction amount $K_2$ shown in the equation (8), the phase can be compensated by 1.25 times the amount of phase change due to the first correction amount $K_1$, namely, $1.25 t_{fwd}$.

Figure 6:
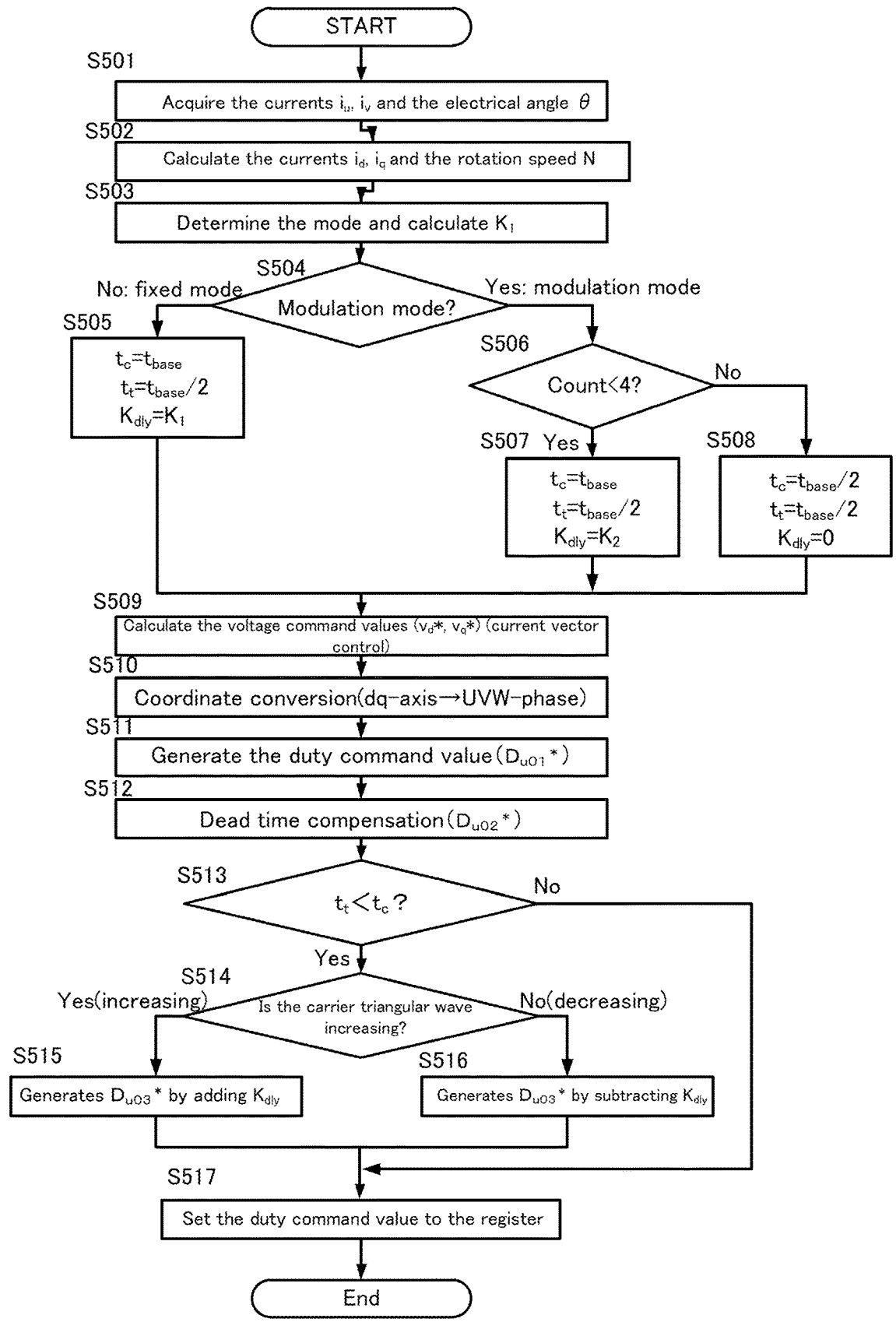
FIG. 6 is a flowchart illustrating a calculating control of a duty command value.

FIG. 6 is a flowchart illustrating an example of a calculation control of a duty command value. This calculation control is repeatedly executed in every control cycle $t_r$. Further, the control in this flowchart may be realized by executing the program stored in the power control apparatus 100.

In Step S501, the power control apparatus 100 (current detectors $7_u$ and $7_v$) acquires the U-phase current $i_u$ and the V-phase current $i_v$ by A/D converting the current values acquired in analog form. At the same time, the power control apparatus 100 acquires the electrical angle θ obtained by A/D converting the position of the rotor detected in analog form from the rotor position detector 201.

In Step S502, the power control apparatus 100 (UVW-phase/dq-axis converter 9) obtains the d-axis current detection value $i_d$ and q-axis current detection value $i_q$ according to the U-phase current $i_u$, the V-phase current $i_v$ and the electrical angle θ obtained in Step S501 based on the equation (2). At the same time, the power control apparatus 100 (motor rotation speed calculator 8) calculates the rotation speed N based on the electrical angle θ.

In Step S503, the power control apparatus 100 (modulation controlling unit 10) selects either the diffusion mode or the fixed mode using the graph shown in FIG. 3 based on the torque command value T* and the rotation speed N. At the same time, the power control apparatus 100 (modulation controlling unit 10) calculates the first correction amount $K_1$ as the compensation amount for compensating for the delays that occur based on the equation (7).

In Step S504, the power control apparatus 100 (modulation controlling unit 10) determines whether or not the diffusion mode is selected, and performs the next processing according to the determination result.

When the fixed mode is selected and the diffusion mode is not selected (S504: No), the power control apparatus 100 (modulation controlling unit 10) then performs the processing of Step S505. When the diffusion mode is selected (S504: Yes), the power control apparatus 100 (modulation controlling unit 10) then performs the processing of Step S506.

In Step S505, as shown in Table 1, the power control apparatus 100 (modulation controlling unit 10) outputs the basic cycle $t_{base}$ as the carrier cycle $t_c$, $t_{base}/2$ as the control cycle $t_r$, and the first correction amount $K_1$ as the correction amount $K_{dly}$. With such a configuration, in this processing, the correction amount $K_{dly}$ is calculated by making a correction of multiplying the first correction amount $K_1$, which is the compensation amount calculated in Step S503, by 1.

On the other hand, in Step S506, the power control apparatus 100 (modulation controlling unit 10) counts up the counter for each control cycle $t_r$ and determines whether or not the counter is smaller than 4.

When the counter is smaller than 4 (S506: Yes), the power control apparatus 100 (modulation controlling unit 10) then performs the processing of Step S507. In Step S507, the power control apparatus 100 (modulation controlling unit 10) sets the basic cycle $t_{base}$ as the carrier cycle $t_c$, $t_{base}/2$ as the control cycle $t_r$, and the second correction amount $K_2$ as the correction amount $K_{dly}$. With such a configuration, in this processing, the correction amount $K_{dly}$ is calculated by making a correction of multiplying the first correction amount $K_1$, which is the compensation amount calculated in Step S504, by 1.25.

When the counter is 4, namely, when the counter is not smaller than 4 (S506: No), the power control apparatus 100 (modulation controlling unit 10) then performs the processing of Step S508. In Step S508, the power control apparatus 100 (modulation controlling unit 10) sets $t_{base}/2$ as the carrier cycle $t_c$, $t_{base}/2$ as the control cycle $t_r$, and zero as the correction amount $K_{dly}$. With such a configuration, in this processing, the correction amount $K_{dly}$ is calculated by making a correction of multiplying the first correction amount $K_1$, which is the compensation amount calculated in Step S504, by 0.

In Step S509, the power control apparatus 100 (torque controlling unit 1) calculates the d-axis voltage command value $v_d$* and q-axis voltage command value $v_q$* by current vector control based on the torque command value T*, the battery voltage detection value $V_{dc}$, the rotation speed N, the d-axis current detection value $i_d$ and the q-axis current detection value $i_q$.

In Step S510, the power control apparatus 100 (dq-axis/UVW-phase converter 2) converts the d-axis voltage command value $v_d$* and q-axis voltage command value $v_q$* into 3-phase PWM voltage command values $v_u$*, $v_v$* and $v_w$* based on the electrical angle detection value θ according to the equation (1).

In Step S511, the power control apparatus 100 (duty command value calculating unit 31 of PWM converter 3) calculates the duty command values $D_{u01}$*, $D_{v01}$* and $D_{w01}$* using 3-phase PWM voltage command values $v_u$*, $v_v$* and $v_w$* and the battery voltage detection value $V_{dc}$ according to the equation (3).

In Step S512, the power control apparatus 100 (dead time compensation processing unit 32 of PWM converter 3) performs compensation processing for dead time addition for the duty command values $D_{u01}$*, $D_{v01}$* and $D_{w01}$* so as to calculate the duty command values $D_{u02}$*, $D_{v02}$* and $D_{w02}$* according to the equation (4).

In Step S513, the power control apparatus 100 (pulse timing correction processing unit 33 of PWM converter 3) determines whether or not the carrier cycle $t_c$ is larger than the control cycle $t_r$. Thus, when the carrier cycle $t_c$ is larger than the control cycle $t_r$ (S513: Yes), the power control apparatus 100 (pulse timing correction processing unit 33) then executes Step S514. On the other hand, when the carrier cycle $t_c$ is not larger than the control cycle $t_t$ (S513: No), the power control apparatus 100 (pulse timing correction processing unit 33) then executes Step S517.

In Step S514, the power control apparatus 100 (pulse timing correction processing unit 33) determines whether the strength of the carrier wave is increasing or decreasing according to the equation (6). Thus, when the carrier wave is increasing (S514: Yes), the power control apparatus 100 (pulse timing correction processing unit 33) then performs the processing of Step S515 in order to add the correction amount $K_{dly}$. When the carrier wave is not increasing but decreasing (S514: No), the power control apparatus 100 (pulse timing correction processing unit 33) then performs the processing of Step S516 in order to subtract the correction amount $K_{dly}$.

In Step S515, according to the equation (5), since the carrier wave is an increasing section and sgn(ΔC) is positive, the power control apparatus 100 (pulse timing correction processing unit 33) calculates the duty command values $D_{u03}^*$, $D_{v03}^*$ and $D_{w03}^*$ by adding the correction amount $K_{dly}$ to the duty command values $D_{u02}^*$, $D_{v02}^*$ and $D_{w02}^*$.

In Step S516, according to the equation (5), since the carrier wave is a decreasing section and sgn(ΔC) is negative, the power control apparatus 100 (pulse timing correction processing unit 33) calculates the duty command values $D_{u03}^*$, $D_{v03}^*$ and $D_{w03}^*$ by subtracting the correction amount $K_{dly}$ from the duty command values $D_{U02}^*$, $D_{v02}^*$ and $D_{w02}^*$.

The carrier cycle $t_c$ and the control cycle $t_t$ are defined in Steps S505-S508, and among these steps, according to the settings in Steps S505 and S506, the carrier cycle $t_c$ becomes larger than the control cycle $t_t$ (S513: Yes), and the correction amount $K_{dly}$ is added or subtracted (S515, S516). According to the settings in Step S507, the carrier cycle $t_c$ becomes smaller than the control cycle $t_t$ (S513: No), the correction amount $K_{dly}$ is not adjusted, and the duty command values $D_{u03}^*$, $D_{v03}^*$ and $D_{w03}^*$ are the duty command values $D_{u02}^*$, $D_{v02}^*$ and $D_{w02}^*$.

In Step S517, the power control apparatus 100 (PWM converter 3) sets the duty command values $D_{u03}^*$, $D_{v03}^*$ and $D_{w03}^*$ calculated in Step S515 or S516 as the duty command values to be used for the calculation in the next section to a register of a microcomputer. Then, the calculation control of the duty command values is accomplished.

Further, after the calculation control of the duty command values shown in Steps S501-S517, the power control apparatus 100 (PWM conversion processing unit 34 of PWM converter 3) compares the duty command values $D_{u03}^*$, $D_{v03}^*$ and $D_{w03}^*$ with the carrier wave to generate the PWM signals $P_{uu0}$, $P_{ul0}$, $P_{vu0}$, $P_{vl0}$, $P_{wu0}$ and $P_{vl0}$.

Then, the power control apparatus 100 (dead time addition processing unit 35 of PWM converter 3) adds the dead time tat to the PWM signals $P_{uu0}$, $P_{ul0}$, $P_{vu0}$, $P_{vl0}$, $P_{wu0}$ and $P_{wl0}$ so as to generate the PWM signals $P_{uu}$, $P_{ul}$, $P_{vu}$, $P_{vl}$, $P_{wu}$ and $P_{wl}$. The dead time addition processing unit 35 outputs the PWM signals $P_{uu}$ and $P_{ul}$ to a pair of U-phase switching elements, the PWM signals $P_{vu}$ and $P_{vl}$ to a V-phase switching element, and the PWM signals $P_{wu}$ and $P_{wl}$ to a W-phase switching element.

When the paired switching elements are driven in each phase based on the PWM signals $P_{uu}$, $P_{ul}$, $P_{vu}$, $P_{vl}$, $P_{wu}$ and $P_{wl}$, the power control apparatus 100 (inverter 4) supplies 3-phase PWM voltages $v_u$, $v_v$, and $v_m$ respectively to each phase of the motor 200.

Thus, the power control apparatus 100 supplies the motor 200 with 3-phase PWM voltages $v_u$, $v_y$, and $v_w$, which are pseudo AC voltages.

FIG. 7 is an explanatory diagram of an example of a PWM control in the fixed mode. Further, for convenience of explanation, only the control related to U-phase is shown in this drawing.

In the example of this drawing, since the fixed mode is selected, as shown in Table 1 above, the carrier cycle $t_c$ is the basic cycle $t_{base}$, the control cycle $t_t$ is $t_{base}/2$, and the correction amount $K_{dly}$ is the first correction amount $K_1$ shown in the equation (7). Therefore, since the control operation is performed every half of the carrier cycle $t_c$, and the carrier cycle $t_c$ includes a decreasing section and an increasing section, the A/D conversion and control operation are performed for each increasing section or decreasing section.

The carrier wave is shown at the top of the drawing. In the following, the decreasing section of the carrier wave shown in the left part is referred to as a section a, the increasing section after the section a shown in the central part is referred to as a section b, and the decreasing section after the section b shown in the right part is referred to as a section c. The section a shows the processing up to the calculation of the duty command value $D_{u03}^*$, and the sections b and c show the processing up to the calculation of the U-phase PWM voltage $v_u$, and show the U-phase current $i_u$ that actually flows between the inverter 4 of the power control apparatus 100 and the motor 200.

In the upper part of the drawing, regarding the sections b and c, the duty command value $D_{u01}^*$ and the duty command value $D_{u02}^*$ are shown by dotted lines and the duty command value $D_{u03}^*$ is shown by solid lines in addition to the carrier wave.

The lower part shows the PWM signals $P_{uu0}$ and $P_{ul0}$ determined using the duty command value $D_{u03}^*$ and the PWM signals $P_{uu}$ and $P_{ul}$ added with the dead time tat. Further, the lower part thereof shows the U-phase PWM voltage $v_u$ applied to the motor 200, the actual value of the U-phase current $i_u$, and the detection value by the current detector $7_u$. Further, this example shows the case where the U-phase current $i_u$ is negative, namely, the U-phase current $i_u$ flows from the motor 200 to the inverter 4.

In the section a, the states of the power control apparatus 100 and the motor 200 are detected in the A/D conversion section which starts from the section start timing. Then, in the control operation section following the A/D conversion section, the duty command value $D_{u02}^*$ and the correction amount $K_{dly}$ are calculated, and the duty command value $D_{u03}^*$ to be used in the section b is calculated by subtracting the correction amount $K_{dly}$ from the duty command value $D_{u02}^*$.

Then, regarding the section b following the section a, the duty command value $D_{u03}^*$ calculated in the previous section a is compared, etc., with the carrier wave so as to generate the PWM signals $P_{uu}$ and $P_{ul}$. By controlling the inverter 4 according to the PWM signals $P_{uu}$ and $P_{ul}$, the U-phase PWM voltage $v_u$ is applied to the motor 200, and the U-phase current $i_u$ flows.

Further, for convenience of explanation, regarding the sections b and c, the duty command value $D_{U02}^*$ and the correction amount $K_{dly}$ calculated in the section a are used to calculate the duty command value $D_{u03}^*$.

The detailed contents of these processings will be described below.

Regarding the section a, first, in the A/D conversion section, the U-phase current $i_u$ is acquired by sampling (A/D conversion) at the current detector $7_u$ (S501).

In a control operation section following the A/D conversion section, the 3-phase PWM voltage command values $v_u^*$, $v_v^*$ and $v_w^*$ are calculated (S503) by the operation of the torque controlling unit 1 and the operation of the dq-axis/UVW-phase converter 2 (S502). Then, the d-axis voltage command value $v_d^*$ and q-axis voltage command value $v_g^*$ are calculated (S509), coordinate conversion is performed, and the 3-phase PWM voltage command values $v_u^*$, $v_v^*$ and $v_w^*$ are calculated (S510).

In the PWM converter 3, the duty command value calculating unit 31 calculates the duty command value $D_{u01}^*$ according to the equation (3). Since the U-phase current $i_u$ is negative, the dead time compensation processing unit 32 calculates the duty command value $D_{u02}^*$ by subtracting the compensation amount "$2 K_D t_{dt}/t_c$" from the duty command value $D_{u01}^*$ according to the equation (4).

After that, the pulse timing correction processing unit 33 acquires the values C1 and C2 of the carrier wave at two timings, and determines the increase or decrease of the carrier wave according to the equation (6). Further, in the example of this figure, since the fixed mode is selected (S504: No), the modulation controlling unit 10 sets the correction amount $K_{dly}$ to be the first correction amount $K_1$ shown in the equation (7), as shown in Table 1.

Regarding the section a, since the carrier wave is decreasing, the pulse timing correction processing unit 33 calculates the duty command value $D_{u03}^*$ by subtracting the correction amount $K_{dly}$ from the duty command value $D_{U02}^*$ according to the equation (5) (S516).

Further, regarding the section b, since the carrier wave is increasing, the pulse timing correction processing unit 33 adds the correction amount $K_{dly}$ calculated in the section a to the duty command value $D_{u02}^*$ to calculate the duty command value $D_{u03}^*$ (S515) according to the equation (5).

Next, a change in the phases of the PWM voltages due to the use of the duty command value $D_{u02}^*$ instead of the duty command value $D_{u01}^*$ will be described.

As shown in the equation (4), since the U-phase current $i_u$ is negative and $sgn(i_u)$ is negative, the duty command value $D_{u02}^*$ is smaller than the duty command value $D_{u01}^*$ by the compensation amount "$2 K_D t_{dt}/t_c$". The conversion value of the compensation amount "$2 K_D t_{dt}/t_c$" to the time unit can be changed by the correction using the compensation amount "$2 K_D t_{dt}/t_c$", namely, the phase of the PWM voltage can be changed by the half value "tat/2" of the dead time tat.

Regarding the section b, since this section is an increasing section and the duty command value $D_{u02}^*$ is obtained by decreasing by the compensation amount "$2 K_D t_{dt}/t_c$", the phase of the PWM voltage can be advanced by the half value "tat/2" of the dead time tat using the duty command value $D_{u02}^*$ instead of the duty command value $D_{u01}^*$. Regarding the section c, since this section is a decreasing section, the phase of the PWM voltage can be delayed by the half value "tat/2" of the dead time tat using the duty command value $D_{u02}^*$ instead of the duty command value $D_{u01}^*$.

Therefore, if the section whose duty command value $D_{u01}^*$ is smaller than the carrier wave is assumed as $t_1$, a section $t_2$ whose duty command value $D_{u02}^*$ is smaller than the carrier wave becomes longer than $t_1$ by the dead time $t_{dt}$, and becomes "$t_2 = t_1 + t_{dt}$". Accordingly, the pulse width of the U-phase PWM voltage $v_u$ can be increased by the dead time $t_{dt}$ using the duty command value $D_{u02}^*$ instead of the duty command value $D_{u01}^*$.

Next, a change in the phases of the PWM voltages due to the use of the duty command value $D_{u03}^*$ instead of the duty command value $D_{U02}^*$ will be described.

According to the equation (5), the duty command value $D_{u03}^*$ is calculated by correcting the duty command value $D_{u02}^*$ using the correction amount $K_{dly}$. Since the correction amount $K_{dly}$ is equal to the first correction amount $K_1$ shown in the equation (7), the phase of the U-phase PWM voltage $v_u$ is changed by a total time "$t_{dt}/2 + t_{dly\_c} + t_{dly\_s} + t_{dly\_cs}$", which is a sum of the half value of dead time $t_{dt}$, the transfer delay $t_{dly\_c}$, the detection delay $t_{dly\_cs}$, and the operation delay $t_{dly\_s}$, namely, $t_{fwd}$ shown in the equation (9), using the duty command value $D_{u03}^*$ instead of the duty command value $D_{U02}^*$.

Since the section b is an increasing section and the duty command value $D_{u03}^*$ is obtained by subtracting the correction amount $K_{dly}$, the phase is advanced by $t_{fwd}$ using the duty command value $D_{u03}^*$ instead of the duty command value $D_{u02}^*$. Since the section c is a decreasing section, the phase is advanced by $t_{fwd}$ using the duty command value $D_{u03}^*$ instead of the duty command value $D_{u02}^*$. Therefore, the phase is advanced by $t_{fwd}$ using the duty command value $D_{u03}^*$ instead of the duty command value $D_{U02}^*$ in both the sections b and c.

Here, a change in control timing due to the duty command value $D_{u02}^*$ and the duty command value $D_{u03}^*$ can be summarized as follows.

Regarding the section b, the phase is advanced by the half value "$t_{dt}/2$" of the dead time $t_{dt}$ using the duty command value $D_{u02}^*$ instead of the duty command value $D_{u01}^*$, and the phase is advanced by "$t_{fwd} - t_{dt}/2 + t_{dly\_c} + t_{dly\_s} + t_{dly\_cs}$" using the duty command value $D_{u03}^*$ instead of the duty command value $D_{U02}^*$. Consequently, the phase of the U-phase PWM voltage $v_u$ is advanced by "$t_{dt} + t_{dly\_c} + t_{dly\_s} + t_{dly\_cs}$" using the duty command value $D_{u03}^*$ instead of the duty command value $D_{u01}^*$.

Regarding the section c, the phase is delayed by the half value "$t_{dt}/2$" of the dead time $t_{dt}$ using the duty command value $D_{u02}^*$ instead of the duty command value $D_{u01}^*$, and the phase is advanced by "$t_{fwd} = t_{dt}/2 + t_{dly\_c} + t_{dly\_s} + t_{dly\_cs}$" using the duty command value $D_{u03}^*$ instead of the duty command value $D_{u02}^*$. Regarding the half value "$t_{dt}/2$" of the dead time $t_{dt}$, since the advance and delay of the phase are canceled, the phase of the U-phase PWM voltage $v_u$ is advanced by "$t_{dly\_c} + t_{dly\_s} + t_{dly\_cs}$" using the duty command value $D_{u03}^*$ instead of the duty command value $D_{u01}^*$.

How the U-phase PWM voltage $v_u$ is calculated using the duty command value $D_{u03}^*$ will be described in the following.

The PWM conversion processing unit 34 compares the duty command value $D_{u03}^*$ with the carrier wave, and generates PWM signals $P_{uu0}$ and $P_{ul0}$ according to the comparison result. When the duty command value $D_{u03}^*$ is larger than the carrier wave, the PWM signal $P_{uu0}$ is in the high level, and when the duty command value $D_{u03}^*$ is smaller than the carrier wave, the PWM signal $P_{uu0}$ is in the low level, and further, the PWM conversion processing unit 34 generates a PWM signal $P_{ul}0$ by inverting the level of the PWM signal $P_{uu0}$.

Here, regarding the switching timing of the PWM signals $P_{uu0}$ and $P_{ul0}$, the phase is advanced by a time corresponding to the correction amount $K_{dly}$ in both the sections b and c using the duty command value $D_{u03}^*$ instead of the duty command value $D_{u02}^*$. Therefore, the low level section of the PWM signal $P_{uu0}$ determined by the duty command value $D_{u03}^*$ and the high level section of the PWM signal $P_{ul0}$ are equivalent to the section $t_2$ in which the duty command value $D_{uo2}^*$ is smaller than the carrier wave. Further, as described above, "$t_2=t_1+t_{dt}$" is established.

The dead time addition processing unit 35 calculates the PWM signals $P_{uu}$ and $P_{ul}$ by delaying the rise timing by the dead time $t_{dt}$ for each of the PWM signals $P_{uu0}$ and $P_{ul0}$.

Comparing with the low level section of the PWM signal $P_{uu0}$, the low level section of the PWM signal $P_{uu}$ is longer by the dead time $t_{dt}$ and is "$t_2+t_{dt}$". Comparing with the high level section of the PWM signal $P_{ul0}$, the high level section of the PWM signal $P_{ul}$ is shorter by the dead time $t_{dt}$ and is "$t_2-t_{dt}$". Further, this "$t_2-t_{dt}$" is equal to "$t_1$".

Further, when both the PWM signals $P_{uu}$ and $P_{uu}$ are in the low level, the upper and lower switching elements are turned OFF, but the U-phase current $i_u$ is negative, and a current i flows from the motor 200 to the power control apparatus 100. Therefore, since only the diode provided beside the upper switching element is in the conducted state due to the configuration of the inverter and the potential voltage of the U-phase PWM voltage $v_u$ is "$V_{dc}/2$", the pulse width at which the potential voltage is "$-V_{dc}/2$" in the U-phase PWM voltage $v_u$ is equivalent to the high level section of the PWM signal $P_{ul}$. Consequently, the pulse width of the U-phase PWM voltage $v_u$ when the duty command value $D_{uo3}^*$ is used is $t_1$, which is equivalent to the pulse width when the duty command value $D_{uo1}^*$ is used.

The inverter 4 is controlled by the PWM signals $P_{uu}$ and $P_{ul}$. In the state when the PWM signal $P_{uu}$ is in the low level and the PWM signal $P_{ul}$ is in the high level, a potential voltage of "$-V_{dc}/2$" is supplied to the U-phase wiring, and in other states, a potential voltage of "$V_{dc}/2$" is supplied to the U-phase wiring. From the change of the supplied potential voltage to the change of the U-phase PWM voltage $v_u$, the timing is delayed by "$t_{dly\_c}+t_{dly\_s}$", which is a sum of the transfer delay $t_{dly\_c}$ and the operation delay $t_{dly\_s}$.

Then, the U-phase current $i_u$, which is a pseudo alternating current, flows according to the change in the U-phase PWM voltage $v_u$. The U-phase current $i_u$ is maximized when the voltage of the U-phase wire changes from "$V_{dc}/2$" to "$-V_{dc}/2$", and is minimized when the voltage of the U-phase wire changes from "$-V_{dc}/2$" to "$V_{dc}/2$". Then, the measured value of the U-phase current $i_u$ is delayed by detection delay $t_{dly\_cs}$ with respect to the actual value.

Therefore, regarding the section b, the detection value of the U-phase current $i_u$ is delayed by a sum of the dead time $t_{dt}$, the transfer delay $t_{dly\_c}$, the operation delay $t_{dly\_s}$, and the detection delay time $t_{dly\_cs}$, namely, "$t_{dt}+t_{dly\_c}+t_{dly\_s}+t_{dly\_cs}$", with respect to the PWM signal $P_{ul0}$ determined by the duty command value $D_{uo3}^*$.

Regarding the section c, the dead time $t_{dt}$ is not added at the fall timing of the PWM signal $P_{ul0}$ corresponding to the minimum value (valley) in the detection value of the U-phase current $i_u$. Therefore, the detection value of the U-phase current $i_u$ is delayed by the sum of the transfer delay $t_{dly\_c}$, the operation delay $t_{dly\_s}$, and the detection delay time $t_{dly\_cs}$, namely, "$t_{dly\_c}+t_{dly\_s}+t_{dly\_cs}$", with respect to the PWM signal $P_{uu0}$.

As described above, in the section b, the timing at which the U-phase current $i_u$ is detected is delayed in phase by "$t_{dt}+t_{dly\_c}+t_{dly\_s}+t_{dly\_cs}$" with respect to the switching timing of the PWM signal $P_{uu0}$ and the PWM signal $P_{ul0}$ before the dead time compensation. However, the switching timing of the PWM signal is advanced in phase by "$t_{dt}+t_{dly\_c}+t_{dly\_s}+t_{dly\_cs}$" using the duty command value $D_{uo3}^*$ instead of the duty command value $D_{uo1}^*$.

In the section c, the timing at which the U-phase current $i_u$ is detected is delayed in phase by "$t_{dly\_c}+t_{dly\_s}+t_{dly\_cs}$" with respect to the switching timing of the PWM signal $P_{uu0}$ and the PWM signal $P_{ul0}$ before the dead time compensation. However, the switching timing of the PWM signal is advanced in phase by "$t_{dly\_c}+t_{dly\_s}+t_{dly\_cs}$" using the duty command value $D_{uo3}^*$ instead of the duty command value $D_{uo1}^*$.

Thus, regarding both the sections b and c, since the correction is made so that the phase is advanced previously by the delay of the generated phase using the duty command value $D_{uo3}^*$ instead of the duty command value $D_{uo1}^*$, the generated delay is offset.

Since the U-phase PWM voltage $v_u$ is switched between "$-V_{dc}/2$" and "$V_{dc}/2$", a current including harmonic flows. Therefore, ideally, it is preferable that the A/D conversion is performed at these switching timings, namely, at a middle point of a peak and a valley where the U-phase current $i_u$ becomes a peak.

In the fixed mode, the carrier wave peaks (becomes peak and valley) in the middle of the detected peaks of the U-phase current $i_u$ using the first correction amount $K_1$ shown in the equation (7). Consequently, it is possible to suppress the mixing of high frequency components due to switching into the current value obtained by A/D conversion at the peak of the carrier wave.

Figure 8:
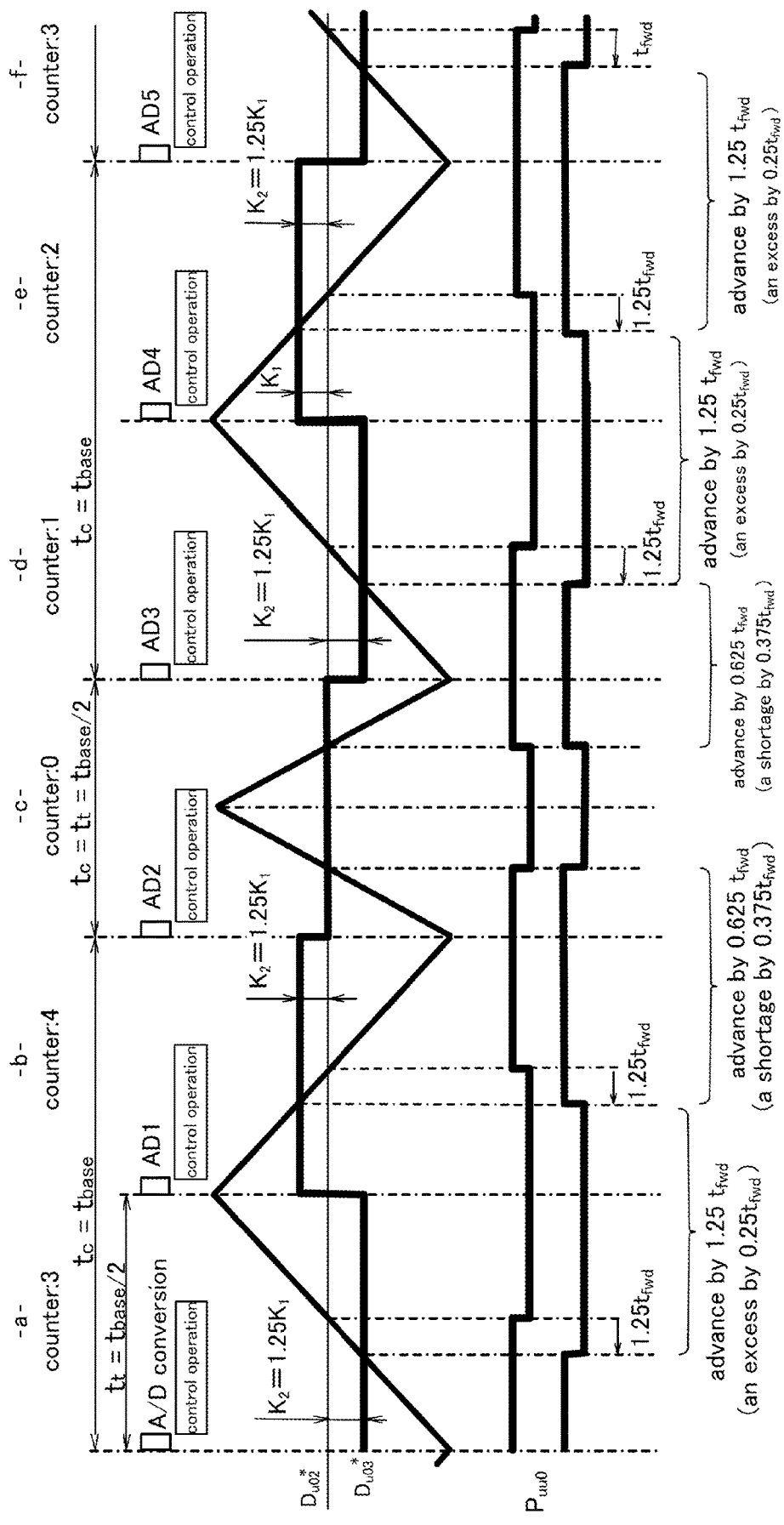
FIG. 8 is an explanatory diagram of another example of the PWM control.

FIG. 8 is an explanatory diagram of an example of PWM control when the diffusion mode is set. In this drawing, six sections a-f are shown, and these sections have the length of the control cycle $t_t$. In each of the sections a-f, A/D conversion and control operation are performed from the beginning of the section, and the duty command value $D_{uo3}^*$ of the next section is calculated. Further, for convenience of explanation, regarding the sections a-f, the duty command value $D_{uo2}^*$ is assumed to be constant.

Regarding the section b, the counter of the modulation controlling unit 10 is 4, and the parameters to be used in the section c are determined according to Step S508. Namely, in the section c, the carrier cycle $t_c$ is the basic cycle $t_{base}/2$, the control cycle $t_t$ is $t_{base}/2$, and the correction amount $K_{dly}$ is zero.

In the sections a, b, d and e, according to Step S507, the carrier cycle $t_c$ is the basic cycle $t_{base}$, the control cycle $t_t$ is $t_{base}/2$, and the correction amount $K_{dly}$ is the second correction amount $K_2$. Further, as shown in the equation (8), the second correction amount $K_2$ corresponds to 1.25 times the first correction amount $K_1$.

A detailed content of each of the sections will be described below.

In the sections a and b, the carrier cycle $t_c$ is the basic cycle $t_{base}$, and the control cycle $t_t$ is $t_{base}/2$. Since the carrier wave has one increasing section and one decreasing section during one basic cycle $t_{base}$, the length of the increasing section and the decreasing section is $t_{base}/2$, which is equal to the control cycle $t_t$. Therefore, the increasing section corresponds to the section a, and A/D conversion and control operation are performed at the beginning of the section. Similarly, the decreasing section corresponds to the section b, and A/D conversion and control operation are performed at the beginning of the section.

In the section c, the carrier cycle $t_c$ is the basic cycle $t_{base}/2$, and the control cycle $t_t$ is $t_{base}/2$. There are an increasing section and a decreasing section during the basic cycle $t_{base}/2$ of the carrier wave. Thus, since the control cycle $t_t$ is equal to the basic cycle and is $t_{base}/2$, control operation is performed only at the beginning of the increasing section, and A/D conversion and control operation are not performed in the decreasing section.

Similar to the sections a and b, the sections d and e are an increasing section and a decreasing section in the carrier wave whose carrier cycle to is the basic cycle $t_{base}$, and A/D conversion and control operation are performed at the beginning of each section.

Here, in each section, whether the phase of the PWM signal changes is examined using the duty command value $D_{u03}*$ instead of the duty command value $D_{u02}*$.

In the sections a, b, d, and e, an intersection of the duty command value and the carrier wave, namely, the phase of the PWM signal $P_{uu0}$, changes by the correction amount $K_{dly}$ as shown in the equation (5), namely, the time "$1.25t_{fwd}$" corresponding to the second correction amount $K_2$.

In the sections a and d, since the carrier wave is an increasing section and the correction amount $K_{dly}$ is subtracted in the equation (5), the phase of the PWM signal $P_{uu0}$ is advanced by "$1.25t_{fwd}$". In the sections b and e, since the carrier wave is a decreasing section and the correction amount $K_{dly}$ is added in the equation (5), the phase of the PWM signal $P_{uu0}$ is advanced by "$1.25t_{fwd}$". Therefore, in the sections a, b, d and e, the phase of the PWM signal $P_{uu0}$ is advanced by "$1.25t_{fwd}$".

In the section c, as indicated in Table 1, the correction amount $K_{dly}$ is zero, and therefore, the phase of the PWM signal $P_{uu0}$ does not change. Since the section c has an increasing section and a decreasing section of the carrier wave, the PWM signal $P_{uu0}$ has two switching timings, but the phases of these two switching timings do not change.

Here, a section in which the PWM signal $P_{uu0}$ is in the high level and a section in which the PWM signal $P_{uu0}$ is in the low level will be examined.

Regarding the low-level section from the fall in the section a to the rise in the section b, the phases of both fall and rise timings are advanced by $1.25t_{fwd}$. Therefore, the phase of the median of the low level section is advanced by $1.25t_{fwd}$. With such a configuration, when compared with $t_{fwd}$, which is the phase lead in the fixed mode, there is an excess in the phase lead by $0.25\ t_{fwd}$.

Regarding the high-level section from the rise in the section b to the fall in the section c, the rise timing of the section b is advanced by $1.25t_{fwd}$, but the fall timing of the section c does not change. Therefore, the median of the high level section is advanced by $0.675t_{fwd}$, which corresponds to a half value of $1.25t_{fwd}$. In this case, when compared with $t_{fwd}$, which is the phase lead in the fixed mode, there is a shortage in the lead by $0.375t_{fwd}$.

Regarding the low-level section from the fall to the rise in the section c, since the correction amount $K_{dly}$ is zero in the section c, there is no phase change in this low-level section.

Regarding the high-level section from the rise in the section c to the fall in the section d, there is a phase lead similar to the high-level section from the rise in the section b to the fall in the section c. With such a configuration, the median of this high-level section is advanced by $0.675\ t_{fwd}$, and there is a shortage in the phase lead by $0.375\ t_{fwd}$ with respect to the phase lead in the fixed mode.

Regarding the low-level section from the fall in the section d to the rise in the section e, there is a phase lead similar to the low-level section from the fall in the section a to the rise in the section b. With such a configuration, the median of this low-level section is advanced in phase by $1.25t_{fwd}$, and there is an excess in the phase lead by $0.25\ t_{fwd}$ with respect to the phase lead in the fixed mode.

Regarding the high-level section from the rise in the section e to the fall in the section f, there is a phase lead similar to the low-level section from the fall in the section a to the rise in the section b. With such a configuration, the median of this high-level section is advanced in phase by $1.25t_{fwd}$, and there is an excess in the phase lead by $0.25t_{fwd}$ with respect to the phase lead in the fixed mode.

Here, considering the phase lead by regarding five sections of the sections a-d as 1 set, or to be exact, by regarding the sections from the level change of the PWM signal $P_{uu0}$ in the section a to the level change of the PWM signal $P_{uu0}$ in the section f as 1 set, there is an excess by $0.25t_{fwd}$ in 3 sections a, d and e, and there is a shortage by $0.25t_w a$ in 2 sections a and d. Consequently, as shown in the following equation, the sums of the excess and the shortage in the phase lead are both $0.75t_{fwd}$, and therefore, both the excess and the shortage are offset.

[Equation 9]

$$025 \times 3 = 0.375 \times 2 = 0.75 \qquad (9)$$

With such a configuration, the operation in the present embodiment will be described as follows. Regarding the section c, the carrier cycle $t_c$ of the carrier wave is $t_{base}/2$, and the increasing section and the decreasing section are $t_{base}/4$, respectively. Therefore, A/D conversion and control operation cannot be completed in the increasing section or the decreasing section, and since the control cycle $t_t$ is $t_{base}/2$, A/D conversion and control operation are performed only in the increasing section. Further, in the section c, the correction amount $K_{dly}$ is zero and there is no change in the phase.

In the sections a, b, d and e, the second correction amount $K_2$, which is 1.25 times the first correction amount $K_1$ used in the fixed mode, is used as the correction amount $K_{dly}$ shown in the equation (5), and therefore, the phase is advanced 1.25 times that of the fixed mode. Therefore, as shown in FIG. 8 and the equation (9), when 1 set of the sections a-f is examined, the phase leads of the high-level section and the low-level section of the PWM signal are the same as the phase lead in the fixed mode as a whole.

Thus, even if the carrier cycle $t_c$ of the carrier wave changes and there is a section such as the section c where the A/D conversion and control operation cannot be completed in an increasing section or a decreasing section, the excess and shortage in the phase lead are offset as a whole using the parameters shown in Table 1.

Figure 9:
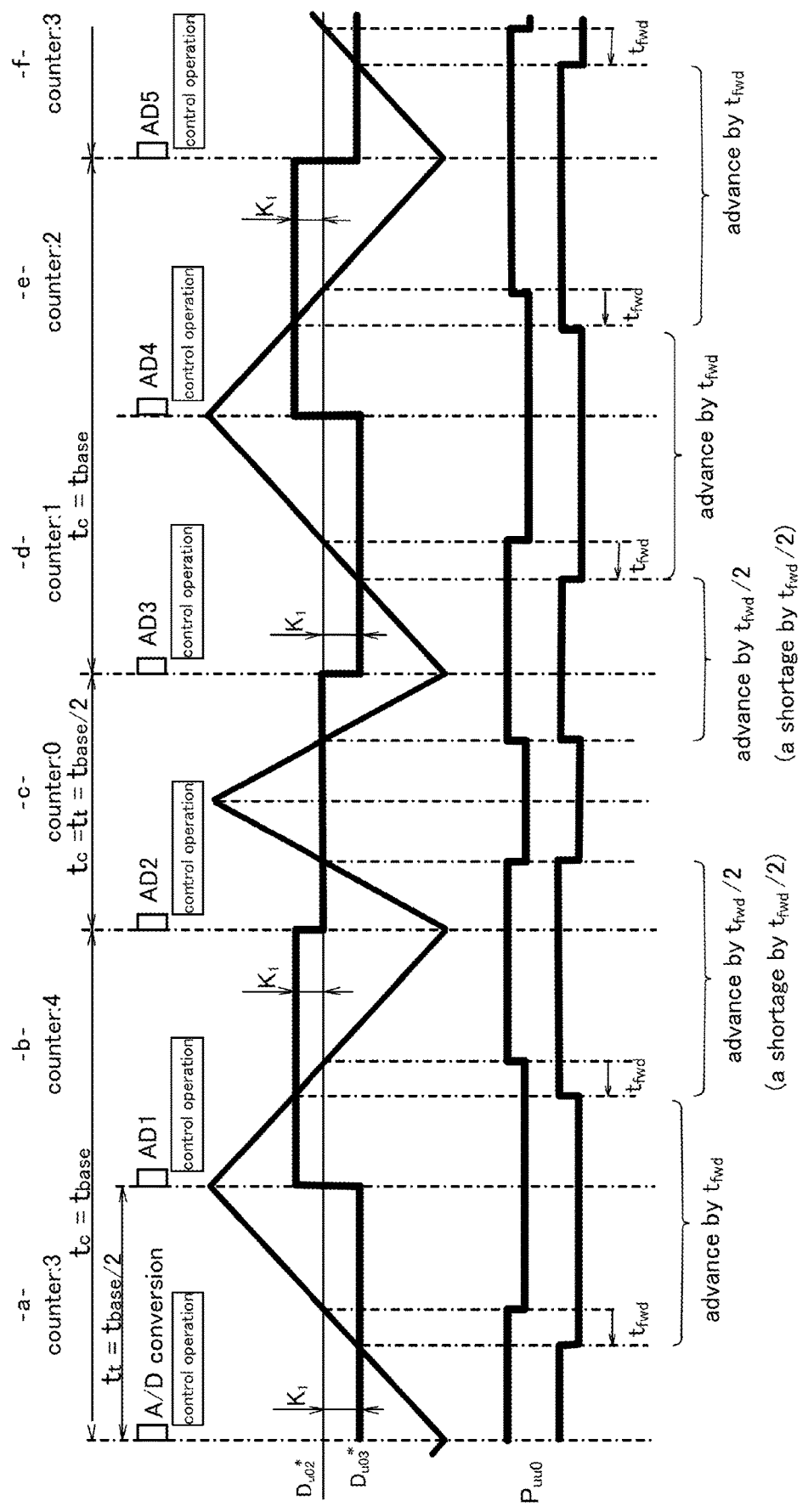
FIG. 9 is an explanatory diagram of the PWM control in a comparative example.

FIG. 9 is an explanatory diagram of a comparative example of PWM control in the case where the diffusion mode is set. Regarding this drawing, in Table 1, it is assumed that the correction amount $K_{dly}$ in the case where the counter is 0-3 is the first correction amount $K_1$.

In such an example, the rise and fall of the PWM signal $P_{uu}$ are advanced in phase by $t_{fwd}$ in the sections a, b, d and e, and do not change in phase in the section c.

First, consider the low-level section from the fall in the section a to the rise in the section b, the low-level section from the fall in the section d to the rise in the section e, and the high-level section from the rise in the section e to the fall in the section f. In these sections, the phase is advanced by $t_{fwd}$ at the start point and the end point of the period, and the median of each section is advanced in phase by $t_{fwd}$. Therefore, the phase lead is the same as that of the fixed mode.

Next, consider the high-level section from the rise in the section b to the fall in the section c and the high-level section from the rise in the section c to the fall in the section d. In these sections, since the phase is advanced by $t_{fwd}$ at either the start point or the end point of the period, the median of each section is advanced in phase by $t_{fwd}/2$, respectively. Therefore, comparing with the phase lead in the fixed mode, the phase lead is insufficient by $t_{fwd}/2$.

Therefore, regarding five sections of the sections a-d, or to be exact, all the sections from the level change of the PWM signal $P_{uu0}$ in the section a to the level change of the section f, the shortage and excess of the phase lead are not offset, and shortage occurs in the phase lead as a whole, resulting in a delay.

Next, with reference to FIGS. 10 and 11, the relation between the correction amount $K_{dly}$ and the value of the current flowing through the motor 200 when each mode is selected will be described.

Figure 10:
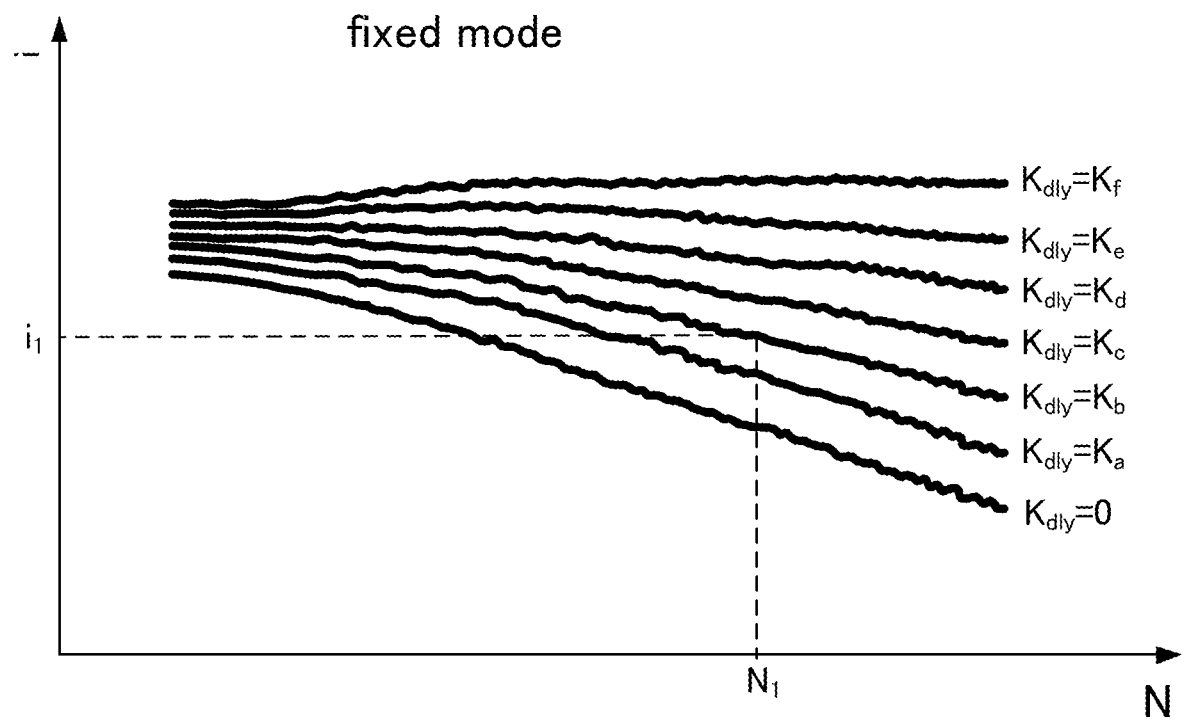
FIG. 10 is a graph illustrating a relation between a current and a rotation speed of a motor in a fixed mode.

FIG. 10 is a graph illustrating a relation between the current i and the rotation speed N of the motor 200 in the fixed mode.

Figure 11:
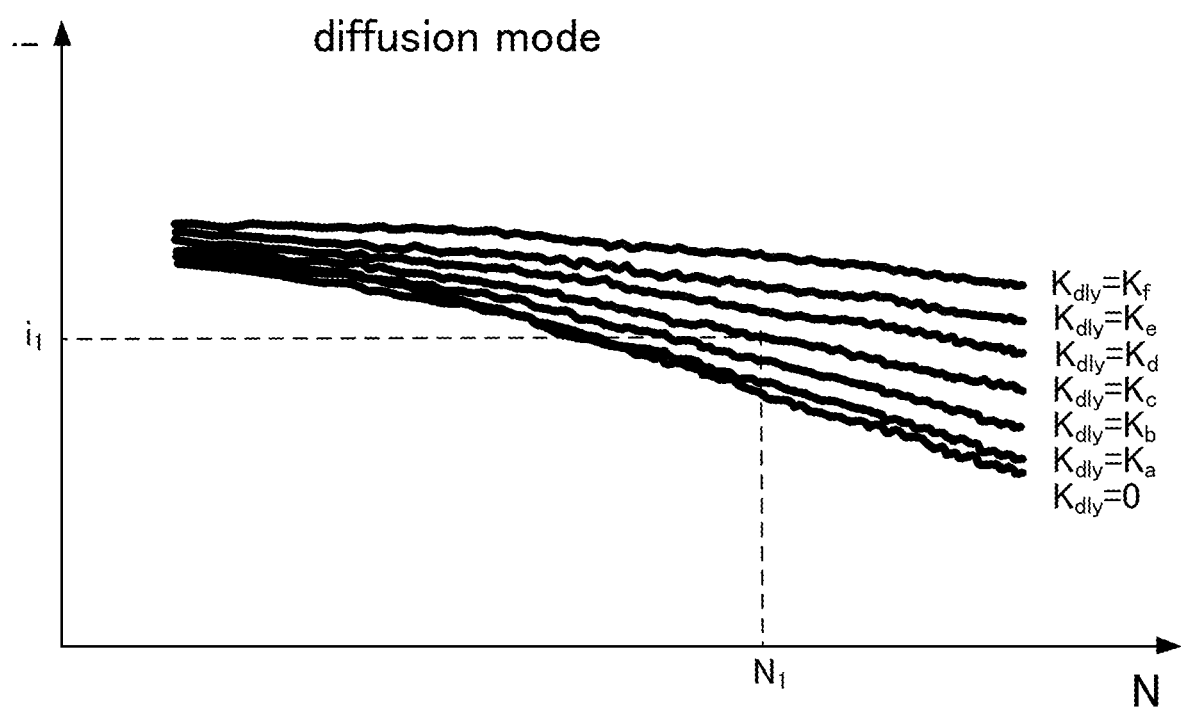
FIG. 11 is a graph illustrating a relation between a current and a rotation speed of a motor in a diffusion mode.

FIG. 11 is a graph illustrating a relation between the current i and the rotation speed N of the motor 200 in the diffusion mode.

In these drawings, the rotation speed N increases from left to right, and the current i increases from bottom to top. Further, regarding the state where the current i supplied to the motor 200 is controlled to be constant, the rated current i that actually flows through the motor 200 according to the change in the rotation speed N is shown. If the phase of the PWM pulse signal changes due to the delay which occurs in the power control apparatus 100, the A/D conversion timing will shift relative to the PWM pulse. Therefore, the PWM harmonic is mixed in, and the current i decreases as the rotation speed N increases.

These drawings show the current i in the case where the correction amount $K_{dly}$ is changed. The correction amount $K_{dly}$ is changed from zero to $K_f$, and increases in this order of 0, $K_a$, $K_b$, $K_c$, $K_d$, $K_e$, $K_f$. In each of the fixed mode and the diffusion mode, the decreasing rate of the current i with respect to the increase of the rotation speed N decreases as the correction amount $K_{dly}$ increases. Thus, in the fixed mode, when the correction amount $K_{dly}$ is $K_f$, the current i does not substantially change as the rotation speed N increases.

Further, when the correction amounts $K_{dly}$ are the same, the decreasing rate of the current i with respect to the increase of the rotation speed N is larger in the diffusion mode than in the fixed mode. Therefore, in order to equalize the flowing currents i, it is necessary to make the correction amount $K_{dly}$ in the diffusion mode larger than the correction amount $K_{dly}$ in the fixed mode.

For example, in the fixed mode shown in FIG. 10, when the rotation speed is $N_1$ and the correction amount is $K_b$, the current is $i_1$. In the diffusion mode shown in FIG. 11, when the rotation speed is $N_1$ and the correction amount is $K_c$, the current is $i_1$. Thus, it is assumed that the correction amount $K_c$ is 1.25 times the correction amount $K_b$.

In such a case, if the correction amount $K_b$ is used as the first correction amount $K_1$, the second correction amount $K_2$ becomes the correction amount $K_c$. Therefore, when the rotation speed is controlled at a constant speed of $N_1$, the current i does not change even if the mode is changed between the fixed mode and the diffusion mode. Therefore, the mode change between the fixed mode and the diffusion mode can be performed smoothly.

Thus, as shown in FIGS. 10 and 11, the decreasing rate of the current i according to the rotation speed N is smaller in the diffusion mode than in the fixed mode. Further, the larger the correction amount $K_{dly}$, the smaller the decreasing rate of the current i. Therefore, in order to equalize the currents i flowing through the motor 200 at the same rotation speed N, it is necessary to make the second correction amount $K_2$ in the diffusion mode larger than the first correction amount $K_1$ in the fixed mode.

In the present embodiment, since the correction amount $K_{dly}$ of the diffusion mode is the second correction amount $K_2$ and is 1.25 times the first correction amount $K_1$ which is the correction amount $K_{dly}$ of the fixed mode, it is larger than the first correction amount $K_1$. Therefore, when the mode is changed between the fixed mode and the diffusion mode, the change of the current i is unlikely to occur, and therefore, an occurrence of a torque step or the like of the motor 200 can be suppressed and the control characteristics can be improved.

According to the present embodiment, the following effects can be obtained.

According to the power control method of the present embodiment, the power control apparatus 100 calculates the first correction amount $K_1$ that compensates for the phase shift $t_{fwd}$ which occurs in the PWM voltage (S504). Then, the power control apparatus 100 obtains the correction amount $K_{dly}$ by correcting the first correction amount $K_1$ according to the control cycle $t_t$ of the carrier signal (S508), and corrects the duty command value according to whether the carrier signal is increasing or decreasing using the correction amount $K_{dly}$ (S514-S516).

Particularly, as shown in the flowchart of FIG. 6, in Step S505 which is the fixed mode, the carrier cycle $t_c$ is $t_{base}/2$, and the first correction amount $K_1$ is set as it is as the correction amount $K_{dly}$. In Step S506 which is the diffusion mode, the carrier cycle $t_c$ is $t_{base}$, and the second correction amount $K_2$, which is 1.25 times the first correction amount $K_1$, is set as the correction amount $K_{dly}$. Further, in Step S507, when the carrier cycle $t_c$ is $t_{base}/2$, zero is set as the correction amount $K_{dly}$.

In the processing of Step S507, when the carrier cycle $t_c$ is $t_{base}/2$, the processing cycle required for sampling and calculation of the duty command value is shorter than an interval at which the carrier wave becomes a peak or a valley. Therefore, sampling cannot be performed at the timing when the carrier wave becomes a peak or a valley. In such a case, if the duty command value is further corrected using the correction amount $K_{dly}$, the pulse width of the generated PWM signal deviates from the desired value, and is not preferable. Therefore, it is possible to suppress the deviation from the command value in the PWM signal by setting the first correction amount $K_1$ to zero according to the carrier cycle $t_c$. Consequently, the control accuracy of the motor 200 can be improved.

According to the power control method of the present embodiment, in the diffusion mode, the carrier cycle $t_c$ can be switched between different cycles, $t_{base}$ and $t_{base}/2$, by a repeating rule according to the counter. When the counter is 0-3 and the carrier cycle $t_c$ is $t_{base}$, the second correction amount $K_2$ is used as the correction amount $K_{dly}$. When the counter is 4 and the carrier cycle $t_c$ is $t_{base}/2$, zero is used as the correction amount $K_{dly}$. Thus, since the phase lead and delay of the finally generated PWM signal as a whole can be offset even when switching carrier waves with different carrier cycles $t_c$ according to a predetermined repeating rule, the control accuracy of the motor 200 can be improved.

More specifically, the second correction amount $K_2$ is 1.25 (5/4) times the first correction amount $K_1$ according to $t_{fwd}$, which is the delay time in the power control apparatus 100. This is because the second correction amount $K_2$ is used in 4 counts which are 0-3 among the 5 counts where the counter is 0-4 and zero is used in 1 count where the counter is 4.

Considering the 5 counts together, in the fixed mode where the correction amount $K_{dly}$ is the first correction amount $K_1$ in 5 counts, and in the diffusion mode where the correction amount $K_{dly}$ is the second correction amount $K_2$ in 4 counts and the correction amount $K_{dly}$ is zero in 1 count, the overall sums of the correction amounts $K_{dly}$ are equal.

For this reason, the second correction amount $K_2$ in the diffusion mode is calculated according to the proportion of the carrier frequencies at which the correction amounts are zero in the combination of carrier frequencies. In this way, the overall delays can be equalized. Therefore, since there is no difference in delay in the transition between the fixed mode and the diffusion mode, the occurrence of the torque step due to mode switching can be suppressed, and therefore, the control accuracy of the motor 200 can be improved.

According to the power control method of the present embodiment, in Step S507, when the carrier cycle $t_c$ is $t_{base}/2$, zero is set as the correction amount $K_{dly}$ as shown in the flowchart of FIG. 6. Further, when the carrier cycle $t_c$ is $t_{base}/2$, the interval between peak and valley is $t_{base}/4$, which is shorter than the time of sampling and calculating the duty command value.

Therefore, even if the control cycle $t_r$ is set to $t_{base}/4$ and the sampling is to be started at both the peak and valley timings of the carrier wave, the operation of the duty command value is not completed during the control cycle $t_r$. Therefore, it is necessary to set the control cycle $t_r$ to $t_{base}/2$.

In such a control cycle $t_r$, there are two PWM signal switching timings, and therefore, if the duty command value is corrected according to the increase or decrease of the carrier signal, the two switching timings will be respectively advanced and delayed, and thus deviate from the desired pulse width. Therefore, in the diffusion mode, when the carrier cycle $t_c$ is $t_{base}/2$ and the sampling cannot be started at both the peak and valley timings of the carrier wave, the pulse width of the PWM signal can be brought closer to the desired width by calculating with the correction amount $K_{dly}$ set to zero. Consequently, the control accuracy of the motor 200 can be improved.

According to the power control method of the present embodiment, in the diffusion mode, the correction amount $K_{dly}$ is zero in 1 count among the 5 counts, and is 1.25 times the first correction amount $K_1$ in the remaining 4 counts, and the second correction amount $K_2$, which is larger than the first correction amount $K_1$, is used.

As shown in FIGS. 10 and 11, the decreasing rate of the current according to the increase of the rotation speed in the fixed mode is larger than the decreasing characteristic in the diffusion mode. Therefore, in the state where the motor 200 is controlled at the same rotation speed $N_1$, the current value $i_1$ in the case where the relatively large second correction amount $K_2$ is used in the diffusion mode is substantially equal to the current value $i_1$ in the case where the first correction amount $K_1$ is used in the fixed mode.

Therefore, since the current value does not substantially change due to the mode change between the fixed mode and the diffusion mode, the torque fluctuation can be suppressed. Consequently, the control accuracy of the motor 200 can be improved.

According to the power control method of the present embodiment, as shown in FIG. 3, the diffusion mode is selected when the rotation speed N is relatively small and the torque command value T* is relatively large. When the rotation speed N is small and the load is high, noise may be generated due to resonance caused by the operation of the inverter. In such a case, the generation of noise can be suppressed by selecting the diffusion mode and changing the cycle of carrier waves to shorten the cycle of some carrier waves and set them to a high frequency.

According to the power control apparatus 100 of the present embodiment, as shown in the equation (5), the correction amount $K_{dly}$ to be used for the calculation of the duty command value $D_{uo3}*$ is the first correction amount $K_1$ in the fixed mode and is the second correction amount $K_2$ or zero in the diffusion mode. Further, as shown in the equation (8), the second correction amount $K_2$ is obtained by multiplying the first correction amount $K_1$ by 1.25. Further, as shown in the equation (7), since the first correction amount $K_1$ includes a component due to the dead time tat, the correction amount $K_{dly}$ includes a component due to the dead time tat in any mode.

As shown in FIG. 7, the phase of the PWM signal is changed by "$t_{dt}/2$", which is the half value of the dead time $t_{dt}$, using the duty command value $D_{Uo2}*$ instead of the duty command value $D_{uo1}*$. The phase is advanced in the increasing section of the carrier wave of section b, and the phase is delayed in the decreasing section of section c. Further, the switching timing is advanced by $t_{fwd}$ in the increasing section of section b using the duty command value $D_{uo3}*$ instead of the duty command value $D_{uo2}*$. In the decreasing section of section c, the phase is advanced by $t_{fwd}$.

Consequently, the phase is advanced by "$t_{dt}+t_{dly\_c}+t_{dly\_s}+t_{dly\_cs}$" in the increasing section of the section b and advanced by "$t_{dly\_c}+t_{dly\_s}+t_{dly\_cs}$" in the decreasing section of the section c using the duty command value $D_{uo3}*$ instead of the duty command value $D_{uo1}*$. Here, the change in the pulse width of the PWM signal due to the dead time addition occurs in the section b and does not occur in the section c.

Therefore, in the section b, since the phase is advanced previously by the dead time $t_{dt}$ using the duty command value $D_{uo3}*$, the phase change caused by the dead time addition is suppressed.

Further, in the section c, since the pulse width of the PWM signal does not change due to the dead time addition, the phase has not been changed previously by the dead time $t_{dt}$ using the duty command value $D_{uo3}*$. Consequently, since the change in the pulse width is suppressed, the current sampling timing can be separated in terms of time from the inverter switching timing, and the mixing of the PWM harmonic in the detection value can be suppressed, and therefore, it is possible to achieve an improvement in the accuracy of the PWM voltage control.

According to the power control apparatus 100 of the present embodiment, as shown in the equation (7), the first correction amount $K_1$ includes components that are caused by the transfer delay $t_{dly\_c}$, which is the delay time in the PWM signal transmission circuit, the operation delay $t_{dly\_s}$, which is the delay time due to the operation of the switching elements, the detection delay $t_{dly\_cs}$, which is the delay time due to the sampling in sensors, input circuits, etc., and so on. Therefore, since the duty command value $D_{uo3}*$ is calculated through the correction using the first correction amount $K_1$, as shown in FIG. 7, it is possible to suppress the generation of PWM signals or these delays that actually occur in the motor 200 when the current i flows. Consequently, since the mixing of PWM harmonic in the detection value can be suppressed, it is possible to achieve an improvement in the accuracy of PWM voltage control.

While the embodiments of the present invention have been described above, the above-described embodiments only show part of application examples of the present invention and are not intended to limit the technical scope of the present invention to the specific configurations of the above-described embodiments.

The invention claimed is:

1. A power control method for calculating a duty command value to be used for a PWM control, generating a PWM signal corresponding to a comparison result between the duty command value and a carrier signal, and applying a PWM voltage to a load by driving an inverter based on the PWM signal, the power control method comprising:
   obtaining a compensation amount according to a phase shift generated in the PWM voltage to compensate for the shift;
   correcting the compensation amount according to a cycle of the carrier signal; and
   correcting the duty command value depending on whether a strength of the carrier signal is increasing or decreasing using the corrected compensation amount.

2. The power control method according to claim 1, further comprising switching the cycle of the carrier signal according to a predetermined repeating rule in the generation of the PWM signal,
   wherein the compensation amount is corrected according to the cycle and the repeating rule.

3. The power control method according to claim 2, wherein
   the compensation amount is corrected to zero when a half of the cycle is shorter than the calculation time of the duty command value.

4. The power control method according to claim 3, wherein
   when the compensation amount is corrected to zero in a specific cycle switched by the repeating rule, the compensation amount, which is corrected according to a cycle different from the specific cycle, is calculated according to a switching rate to the specific cycle in the repeating rule.

5. The power control method according to claim 2, further comprising selecting any one mode of a first mode, in which one cycle of the carrier signal is fixedly used, and a second mode, in which the cycle of the carrier signal is switched in said pattern, according to the operating state of the load,
   wherein the compensation amount corrected according to a part of the cycle in the pattern of the second mode is larger than the compensation amount corrected according to the cycle in the first mode.

6. The power control method according to claim 5, wherein
   the load is an electric motor, and
   the second mode is selected when a rotation speed of the electric motor is lower than a threshold and a torque command value of the electric motor is larger than a threshold, and otherwise the first mode is selected.

7. The power control method according to claim 1, wherein
   the compensation amount is determined according to a time added in an adding process of a dead time.

8. The power control method according to claim 1, wherein
   the compensation amount is determined according to a transfer delay from the generation of the PWM signal to the application of the PWM voltage to the load.

9. The power control method according to claim 1, wherein
   the compensation amount is determined according to a detection delay of the measured value used to generate the duty command value.

10. A power control apparatus, comprising:
   a DC power supply;
   an inverter configured to convert a DC voltage output from the DC power supply into an AC PWM voltage in response to a PWM signal and output the AC PWM voltage to a load; and
   a controlling unit configured to generate the PWM signal, wherein the controlling unit configured to:
   calculate a duty command value according to a state of the load,
   obtain a compensation amount according to a phase shift generated in the PWM voltage so as to compensate for the shift,
   correct the compensation amount according to a cycle of the carrier signal,
   correct the duty command value depending on whether a strength of the carrier signal is increasing or decreasing using the corrected compensation amount, and
   generate the PWM signal according to the comparison result between the duty command value and the corrected carrier signal.

* * * * *